US012560909B2

(12) United States Patent
van Eekelen

(10) Patent No.: US 12,560,909 B2
(45) Date of Patent: Feb. 24, 2026

(54) PLANNING AND CONTROLLING AUTOMATED LAYER PICKERS

(71) Applicant: Lineage Logistics, LLC, Irvine, CA (US)

(72) Inventor: René van Eekelen, Bergen op Zoom (NL)

(73) Assignee: Lineage Logistics, LLC, Irvine, CA (US)

( * ) Notice: Subject to any disclaimer, the term of this patent is extended or adjusted under 35 U.S.C. 154(b) by 370 days.

(21) Appl. No.: 18/095,637

(22) Filed: Jan. 11, 2023

(65) Prior Publication Data

US 2023/0236581 A1 Jul. 27, 2023

Related U.S. Application Data

(60) Provisional application No. 63/298,625, filed on Jan. 11, 2022.

(51) Int. Cl.
*G05B 19/418* (2006.01)
*B65G 1/137* (2006.01)

(52) U.S. Cl.
CPC ....... *G05B 19/41815* (2013.01); *B65G 1/137* (2013.01)

(58) Field of Classification Search
None
See application file for complete search history.

(56) References Cited

U.S. PATENT DOCUMENTS 8,882,432 B2 * 11/2014 Bastian, II ........... B65G 1/1375
414/282
9,165,360 B1 10/2015 Bates et al.
(Continued)

FOREIGN PATENT DOCUMENTS

CN 1541918 11/2004
CN 101657837 2/2010
(Continued)

OTHER PUBLICATIONS

Rene van Eekelen, "A Multi-Phase Tabu-Search Heuristic to Plan Automatic Gantry Layer Picking," Master Thesis Operations Research and Quantitative Logistics, submitted at Erasmus University, Rotterdam, Netherlands, Oct. 16, 2020, 81 pages.
(Continued)

*Primary Examiner* — Hua Lu
(74) *Attorney, Agent, or Firm* — Barnes & Thornburg LLP

(57) ABSTRACT

Disclosed are techniques for determining and controlling automated layer pick operations. A computer system can receive, from a warehouse management system, a layer pick planning request for at least one order and determine an initial feasible solution for completing the request. The computer system can determine: initial batches of pallets based on grouping destination pallets that require layers of items from same source pallets, corresponding batch scores, initial locations of the pallets based on assigning locations in a pick area to the source and destination pallets, corresponding location scores, initial schedules for the initial batches based on determining an order of tasks to complete each batch, and corresponding schedule scores. For each batch, the computer system can iteratively adjust the initial schedule, initial locations based on the adjusted schedule, and initial batches based on the adjusted schedule and adjusted locations. The computer system can then identify a heuristic solution.

19 Claims, 13 Drawing Sheets

(56) References Cited

U.S. PATENT DOCUMENTS

| | | | | |
|---|---|---|---|---|
| 9,327,397 | B1 * | 5/2016 | Williams | B25J 3/04 |
| 9,561,941 | B1 * | 2/2017 | Watts | G05D 1/0268 |
| 9,635,346 | B2 | 4/2017 | Iida | |
| 9,826,213 | B1 * | 11/2017 | Russell | B65G 69/00 |
| 9,827,683 | B1 * | 11/2017 | Hance | G06Q 10/087 |
| 10,066,925 | B2 | 9/2018 | Kurtz et al. | |
| 10,242,273 | B1 * | 3/2019 | Eckman | G01S 3/00 |
| 10,399,778 | B1 * | 9/2019 | Shekhawat | B65G 1/1373 |
| 10,809,727 | B1 | 10/2020 | Eckman et al. | |
| 11,117,759 | B2 * | 9/2021 | Elazary | B65G 59/02 |
| 11,345,577 | B2 * | 5/2022 | Holwell | G05D 1/0088 |
| 11,403,817 | B1 | 8/2022 | Eckman et al. | |
| 11,479,411 | B2 | 10/2022 | Eckman et al. | |
| 11,568,508 | B2 * | 1/2023 | High | G05D 1/69 |
| 11,681,982 | B2 * | 6/2023 | Sikka | G06Q 10/087 |
| | | | | 705/28 |
| 12,013,686 | B1 * | 6/2024 | Parness | B25J 9/1615 |
| 2007/0276228 | A1 | 11/2007 | Vining et al. | |
| 2008/0025834 | A1 * | 1/2008 | Ponti | B65G 47/086 |
| | | | | 414/799 |
| 2008/0267759 | A1 * | 10/2008 | Morency | B65G 60/00 |
| | | | | 414/788.1 |
| 2010/0266381 | A1 * | 10/2010 | Chilson | G05D 1/024 |
| | | | | 414/809 |
| 2011/0218670 | A1 * | 9/2011 | Bell | B66F 9/0755 |
| | | | | 700/214 |
| 2013/0177379 | A1 * | 7/2013 | Hoffman | B65G 1/00 |
| | | | | 414/800 |
| 2015/0063683 | A1 * | 3/2015 | Fu | G06V 20/64 |
| | | | | 382/154 |
| 2016/0203263 | A1 | 7/2016 | Maier et al. | |
| 2017/0001704 | A1 | 1/2017 | Christenson et al. | |
| 2017/0088355 | A1 * | 3/2017 | Khodl | B25J 5/007 |
| 2017/0091704 | A1 * | 3/2017 | Wolf | G06Q 10/08 |
| 2017/0091957 | A1 * | 3/2017 | Driegen | G06T 3/60 |
| 2017/0158439 | A1 * | 6/2017 | Miele | B65G 1/1373 |
| 2017/0185959 | A1 * | 6/2017 | Meurer | G06Q 10/0875 |
| 2017/0301004 | A1 * | 10/2017 | Chirnomas | G06Q 20/12 |
| 2017/0358087 | A1 | 12/2017 | Armeni et al. | |
| 2018/0033160 | A1 | 2/2018 | Ishigami | |
| 2018/0072212 | A1 | 3/2018 | Alfaro et al. | |
| 2018/0282066 | A1 * | 10/2018 | Wagner | H04B 7/088 |
| 2018/0327196 | A1 * | 11/2018 | Sullivan | B66F 9/02 |
| 2018/0370727 | A1 * | 12/2018 | Hance | B25J 19/023 |
| 2019/0016543 | A1 * | 1/2019 | Turpin | B65G 59/02 |
| 2019/0025846 | A1 * | 1/2019 | Wu | G08G 1/202 |
| 2019/0066035 | A1 * | 2/2019 | Hance | G06Q 10/087 |
| 2019/0152634 | A1 * | 5/2019 | Almogy | B65B 43/58 |
| 2019/0270197 | A1 * | 9/2019 | Wagner | B65G 1/1376 |
| 2019/0303844 | A1 * | 10/2019 | Stevens | B65G 1/0492 |
| 2020/0111251 | A1 * | 4/2020 | Shi | G06V 10/764 |
| 2020/0200912 | A1 * | 6/2020 | Chen | G06V 20/582 |
| 2020/0207250 | A1 * | 7/2020 | Jarvis | G01C 21/3623 |
| 2020/0210680 | A1 | 7/2020 | Shreve et al. | |
| 2020/0302241 | A1 | 9/2020 | White et al. | |
| 2020/0319648 | A1 * | 10/2020 | Eckman | G01C 21/206 |
| 2020/0388044 | A1 | 12/2020 | Cen et al. | |
| 2021/0002074 | A1 * | 1/2021 | Otto | B66F 9/07581 |
| 2021/0009351 | A1 * | 1/2021 | Beinhofer | B25J 13/08 |
| 2021/0233284 | A1 | 7/2021 | Sugio et al. | |
| 2021/0269242 | A1 | 9/2021 | Eckman et al. | |
| 2021/0319393 | A1 * | 10/2021 | Sikka | G06Q 10/087 |
| 2021/0326800 | A1 * | 10/2021 | Jacobus | G05D 1/0246 |
| 2021/0354718 | A1 | 11/2021 | Lu et al. | |
| 2021/0365712 | A1 | 11/2021 | Lu et al. | |
| 2021/0373161 | A1 | 12/2021 | Lu et al. | |
| 2021/0383096 | A1 | 12/2021 | White et al. | |
| 2022/0351464 | A1 | 11/2022 | Eckman et al. | |
| 2024/0262626 | A1 * | 8/2024 | Langenbach | G05B 19/4182 |
| 2024/0296417 | A1 * | 9/2024 | Moulinec | G06T 7/70 |

FOREIGN PATENT DOCUMENTS

| | | |
|---|---|---|
| CN | 108292381 | 7/2018 |
| CN | 108750521 | 11/2018 |
| CN | 108856301 | 11/2018 |
| WO | WO 2018/090081 | 5/2018 |
| WO | WO 2020/210397 A1 | 10/2020 |

OTHER PUBLICATIONS

Anand, R., Aggarwal, D., and Chahar, V. (2017). A comparative analysis of optimization solvers. 20(4):623-635.

Andriansyah, R., Etman, L. F. P., Adan, I. J. B. F., and Rooda, J. E. (2014). Design andanalysis of an automated order-picking workstation. Journal of Simulation, 8(2):151-163.

Belenguer, J. M., Benavent, R., Prins, C., Prodhon, C., and Wolfler Calvo, R. (2011). A branch-and-cut method for the capacitated location-routing problem. Computers & Operations Research, 38(6):931-941.

Bish, E. K., Leong, T. Y., Li, C. L., Ng, J. W. C., and Simchi-Levi, D. (2001). Analysis of a new vehicle scheduling and location problem. Naval Research Logistics, 48(5):363-385.

Chen, L., Langevin, A., and Riopel, D. (2010). The storage location assignment and interleaving problem in an automated storage/retrieval system with shared storage. International Journal of Production Research, 48(4):991-1011.

De Camargo, R. S., De Miranda, G., and L kketangen, A. (2013). A new formulation and an exact approach for the many-to-many hub location-routing problem. Applied Mathematical Modelling, 37(12):7465-7480.

De Koster, R. (2008). Warehouse assessment in a single tour. In Facility Logistics, Auerbach Publications, pp. 39-60.

De Koster, R., Le-Duc, T., and Roodbergen, K. J. (2007). Design and control of warehouse order picking: A literature review. European Journal of Operational Research, 182(2):481-501.

Escobar, J. W., Linfati, R., Baldoquin, M. G., and Toth, P. (2014). A granular variable tabu neighborhood search for the capacitated location-routing problem. Transportation Research Part B: Methodological, 67:344-356.

Galle, V., Barnhart, C., and Jaillet, P. (2018). Yard crane scheduling for container storage, retrieval, and relocation. European Journal of Operational Research, 271(1):288-316.

Glover, F. (1986). Future paths for integer programming and links to artificial intelligence. Computers & Operations Research, 13(5):533-549.

Goetschalckx, M. and Ashayeri, J. (1989). Classification and design of order picking systems. Logistics World, 2 (2):99-106.

Heshmati, S., To olo, T. A., Vancroonenburg, W., and Vanden Berghe, G. (2019). Crane-operated warehouses: Integrating location assignment and crane scheduling. Computers & Industrial Engineering, 129:274-295.

Kim, B., Heragu, S. S., Graves, R. J., and Onge, A. S. (2003a). Clustering-based order-picking sequence algorithm for an automated warehouse. International Journal of Production Research, 41(15):3445-3460.

Kim, B., Heragu, S. S., Graves, R. J., and Onge, A. S. (2003b). Realization of a short cycle time in warehouse replenishment and order picking. International Journal of Production Research, 41(2):349-364.

Kleinberg, J. and Tardos, E. (2006). Algorithm Design, chapter 8: NP and Computational Intractability, Addison-Wesley Longman Publishing Co., Inc., pp. 451-530.

Koh, S. G., Kwon, H. M., and Kim, Y. J. (2005). An analysis of the end-of-aisle order picking system: Multi-aisle served by a single order picker. International Journal of Production Economics, 98(2):162-171.

Kozan, E. and Preston, P. (2007). Mathematical modelling of container transfers and storage locations at seaport terminals. In Container Terminals and Cargo Systems, Springer, pp. 87-105.

Levine, S., Pastor, P., Krizhevsky, A., Ibarz, J., and Quillen, D. (2018). Learning hand-eye coordination for robotic grasping with

(56) References Cited

OTHER PUBLICATIONS deep learning and large-scale data collection. The International Journal of Robotics Research, 37 (4-5):421-436.

Li, L. and Bozer, Y. A. (2010). Retrieval strategies for multi-tier automated carousel conveyors with multiple robots. Simulation, 86(7):395-404.

Mladenovi c, N. and Hansen, P. (1997). Variable neighborhood search. Computers & Operations Research, 24 (11):1097-1100.

Mokhtari, N. and Abbasi, M. (2014). Applying VNPSO algorithm to solve the many-to-many hub location-routing problem in a large scale. European Online Journal of Natural and Social Sciences, 3(4):647-656.

Nagy, G. and Salhi, S. (1998). The many-to-many location-routing problem. Top, 6(2):261-275.

Sahni, S. and Gonzalez, T. (1976). P-complete approximation problems. Journal of the ACM, 23(3):555-565.

Tuzun, D. and Burke, L. I. (1999). A two-phase tabu search approach to the location routing problem. European Journal of Operational Research, 116(1):87-99.

Xue, Z., Zhang, C., Miao, L., and Lin, W. H. (2013). An ant colony algorithm for yard truck scheduling and yard location assignment problems with precedence constraints. Journal of Systems Science and Systems Engineering, 22(1):21-37.

Yang, P., Miao, L., Xue, Z., and Qin, L. (2015a). An integrated optimization of location assignment and storage/retrieval scheduling in multi-shuttle automated storage/retrieval systems. J Intell Manuf, 26:1145-1159.

Yang, P., Miao, L., Xue, Z., and Ye, B. (2015b). Variable neighborhood search heuristic for storage location assignment and storage/retrieval scheduling under shared storage in multi-shuttle automated storage/retrieval systems. Transportation Research Part E: Logistics and Transportation Review, 79:164-177.

Extended European Search Report in European Appln No. 20787294. 6, dated Nov. 3, 2022, 12 pages.

International Preliminary Report on Patentability in International Appln. No. PCT/US2020/027326, dated Oct. 21, 2021, 7 pages.

International Search Report and Written Opinion in International Application No. PCT/US20/27326, dated Jul. 9, 2020, 9 pages.

Otto Motors, "AGV vs. SDV—A Comparison of Automated Material Transport" Otto Motors, Mar. 2019, 6 pages.

OttoMotors.com [online], "OTTO® SDVs can move that", retrieved on May 14, 2020, retrieved from URL<https://ottomotors.com/sdvs>, 3 pages.

International Search Report and Written Opinion in International Appln. No. PCT/US2022/024710, mailed on Aug. 2, 2022, 16 pages.

International Search Report and Written Opinion in International Appln. No. PCT/US2023/010552, mailed on Jul. 2, 2023, 13 pages.

Bruno, Javier et al., "Programming of GPU Clusters with OmpSs", 2012 IEEE 26th International Parallel and Distributed Processing Symposium, IEEE Xplore, Aug. 16, 2012, pp. 557-568.

First Examination Report in Indian Application No. 202417053963, dated Nov. 17, 2025, 7 pages.

* cited by examiner

200

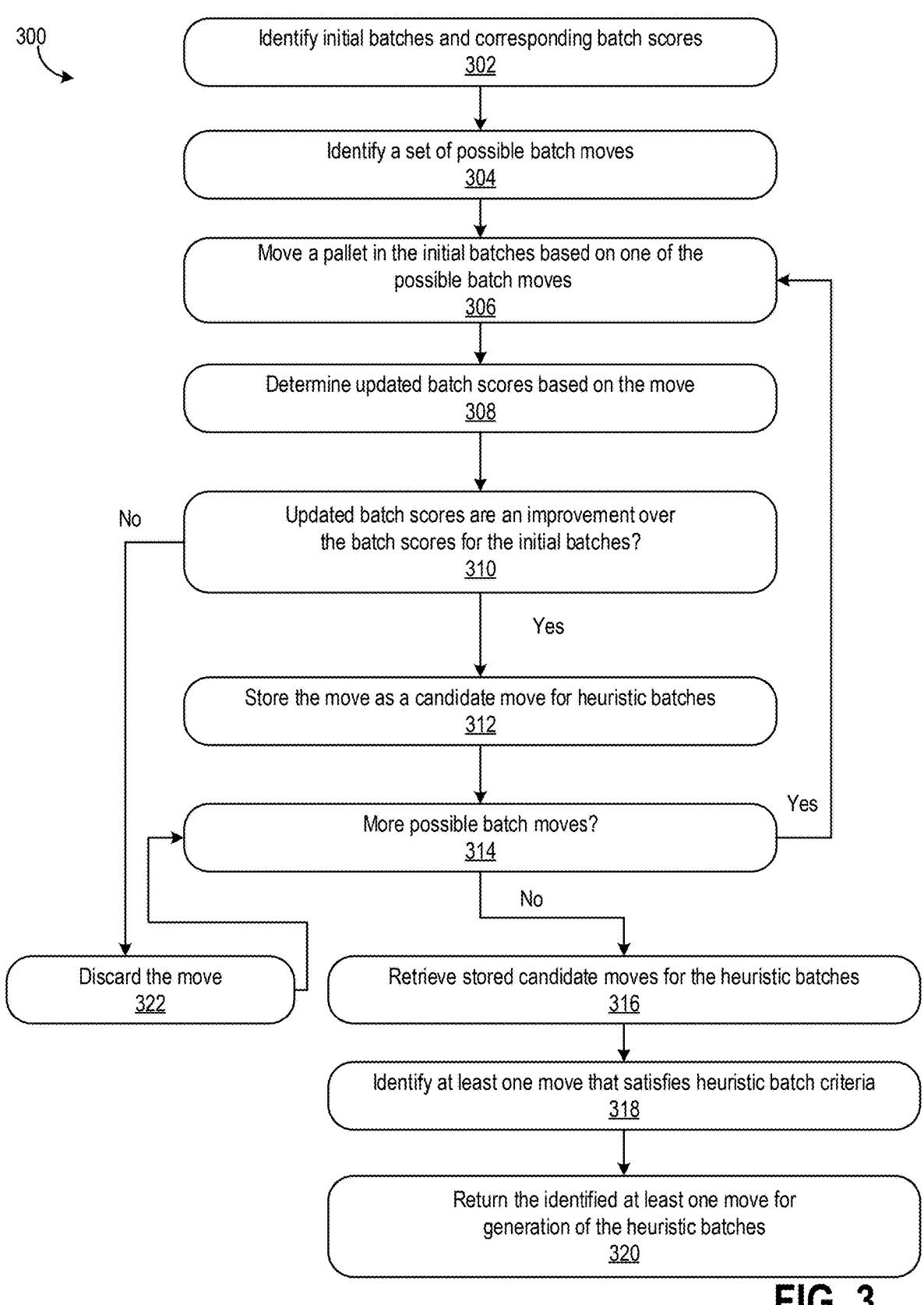

300

Identify initial batches and corresponding batch scores
302

Identify a set of possible batch moves
304

Move a pallet in the initial batches based on one of the possible batch moves
306

Determine updated batch scores based on the move
308

Updated batch scores are an improvement over the batch scores for the initial batches?
310

No

Yes

Store the move as a candidate move for heuristic batches
312

More possible batch moves?
314

Yes

No

Discard the move
322

Retrieve stored candidate moves for the heuristic batches
316

Identify at least one move that satisfies heuristic batch criteria
318

Return the identified at least one move for generation of the heuristic batches
320

FIG. 3

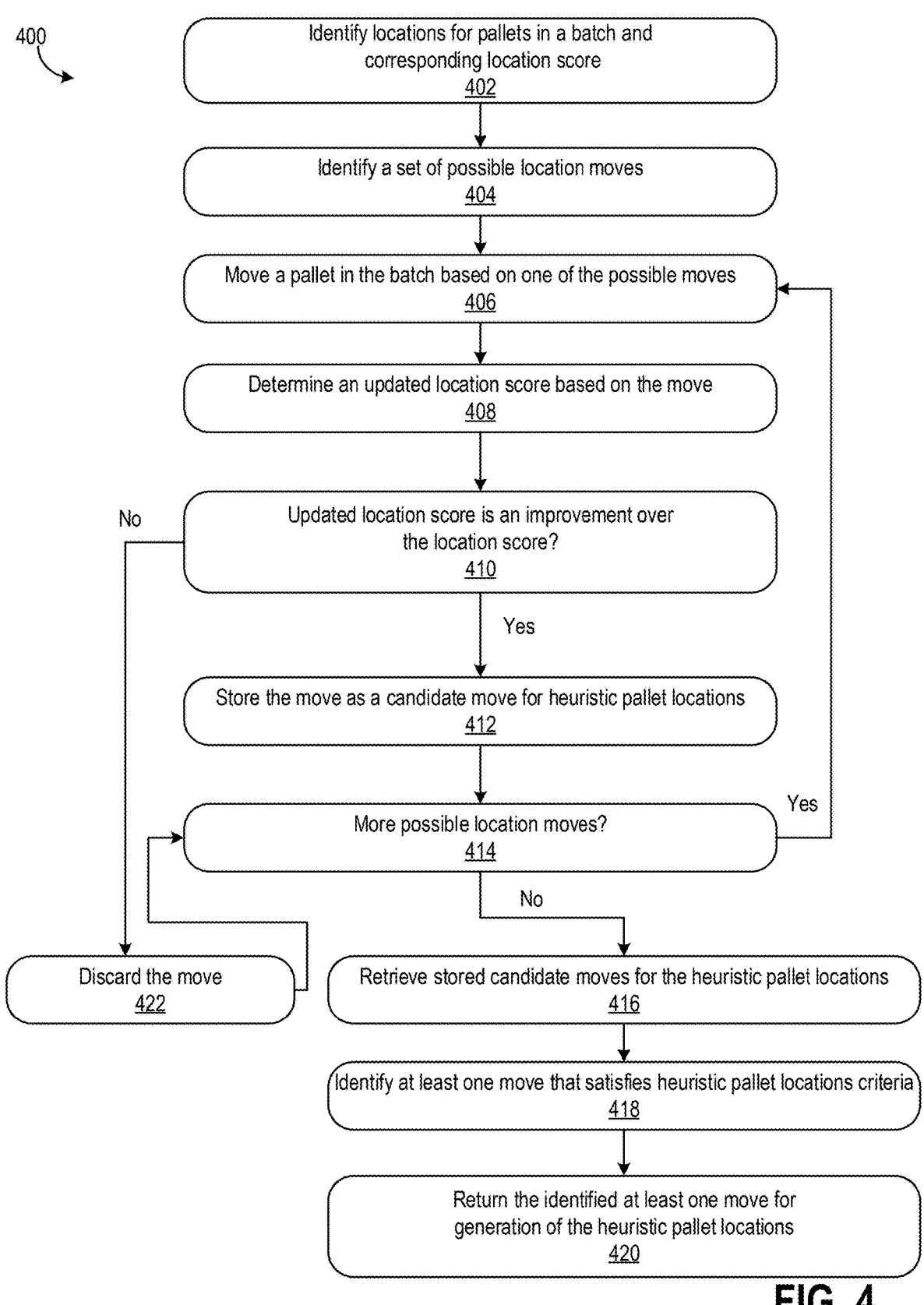

400

Identify locations for pallets in a batch and
corresponding location score
402

Identify a set of possible location moves
404

Move a pallet in the batch based on one of the possible moves
406

Determine an updated location score based on the move
408

Updated location score is an improvement over
the location score?
410

No

Yes

Store the move as a candidate move for heuristic pallet locations
412

More possible location moves?
414

Yes

No

Discard the move
422

Retrieve stored candidate moves for the heuristic pallet locations
416

Identify at least one move that satisfies heuristic pallet locations criteria
418

Return the identified at least one move for
generation of the heuristic pallet locations
420

FIG. 4

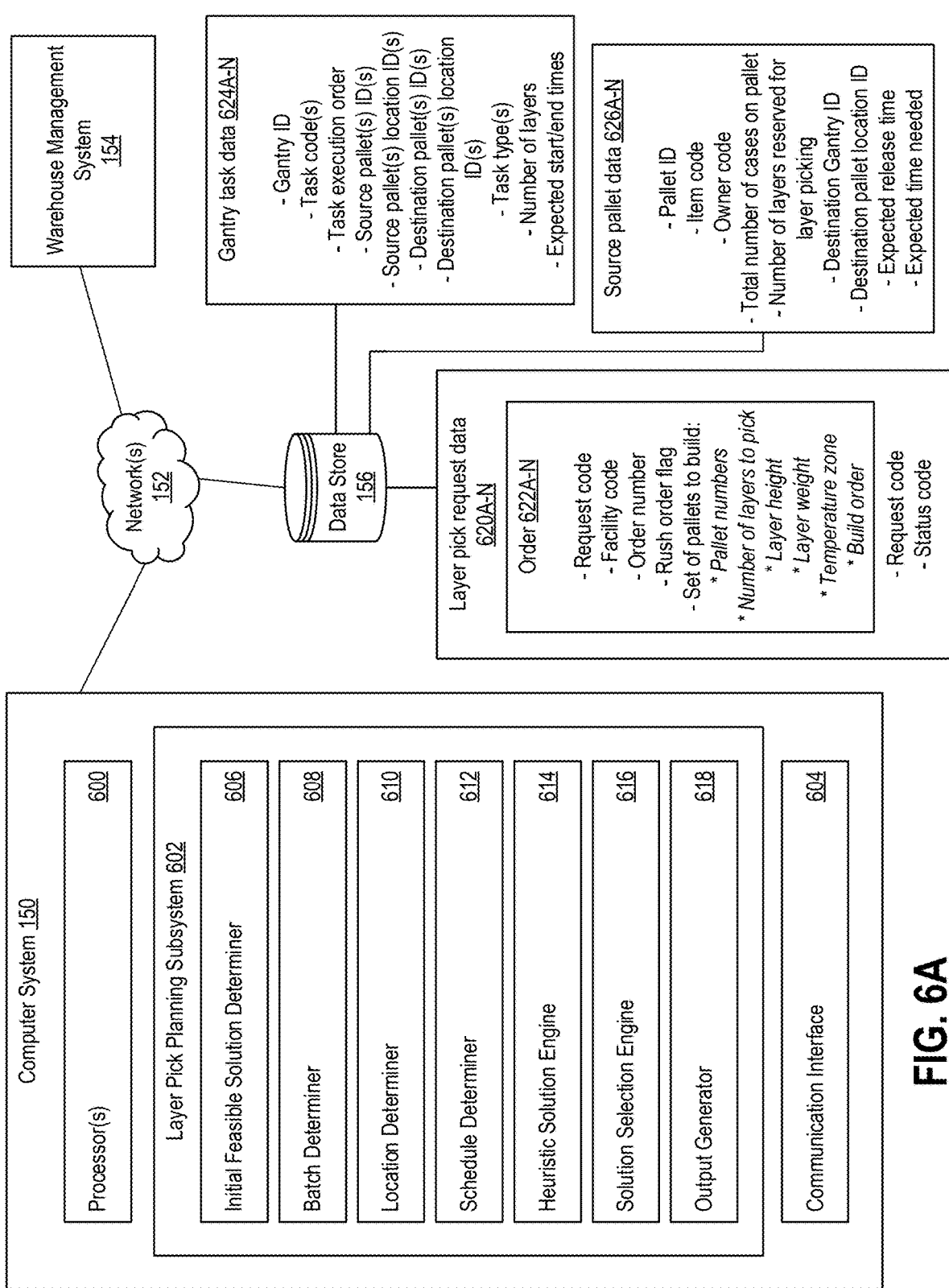

FIG. 6A

Warehouse Management System 154

Gantry task data 624A-N

- Gantry ID
- Task code(s)
- Task execution order
- Source pallet(s) ID(s)
- Source pallet(s) location ID(s)
- Destination pallet(s) ID(s)
- Destination pallet(s) location ID(s)
- Task type(s)
- Number of layers
- Expected start/end times Source pallet data 626A-N

- Pallet ID
- Item code
- Owner code
- Total number of cases on pallet
- Number of layers reserved for layer picking
- Destination Gantry ID
- Destination pallet location ID
- Expected release time
- Expected time needed Network(s) 152

Data Store 156

Layer pick request data 620A-N

Order 622A-N

- Request code
- Facility code
- Order number
- Rush order flag
- Set of pallets to build:
  * Pallet numbers
  * Number of layers to pick
    * Layer height
    * Layer weight
    * Temperature zone
    * Build order
- Request code
- Status code Computer System 150

600

Processor(s)

Layer Pick Planning Subsystem 602

Initial Feasible Solution Determiner 606

Batch Determiner 608

Location Determiner 610

Schedule Determiner 612

Heuristic Solution Engine 614

Solution Selection Engine 616

Output Generator 618

Communication Interface 604

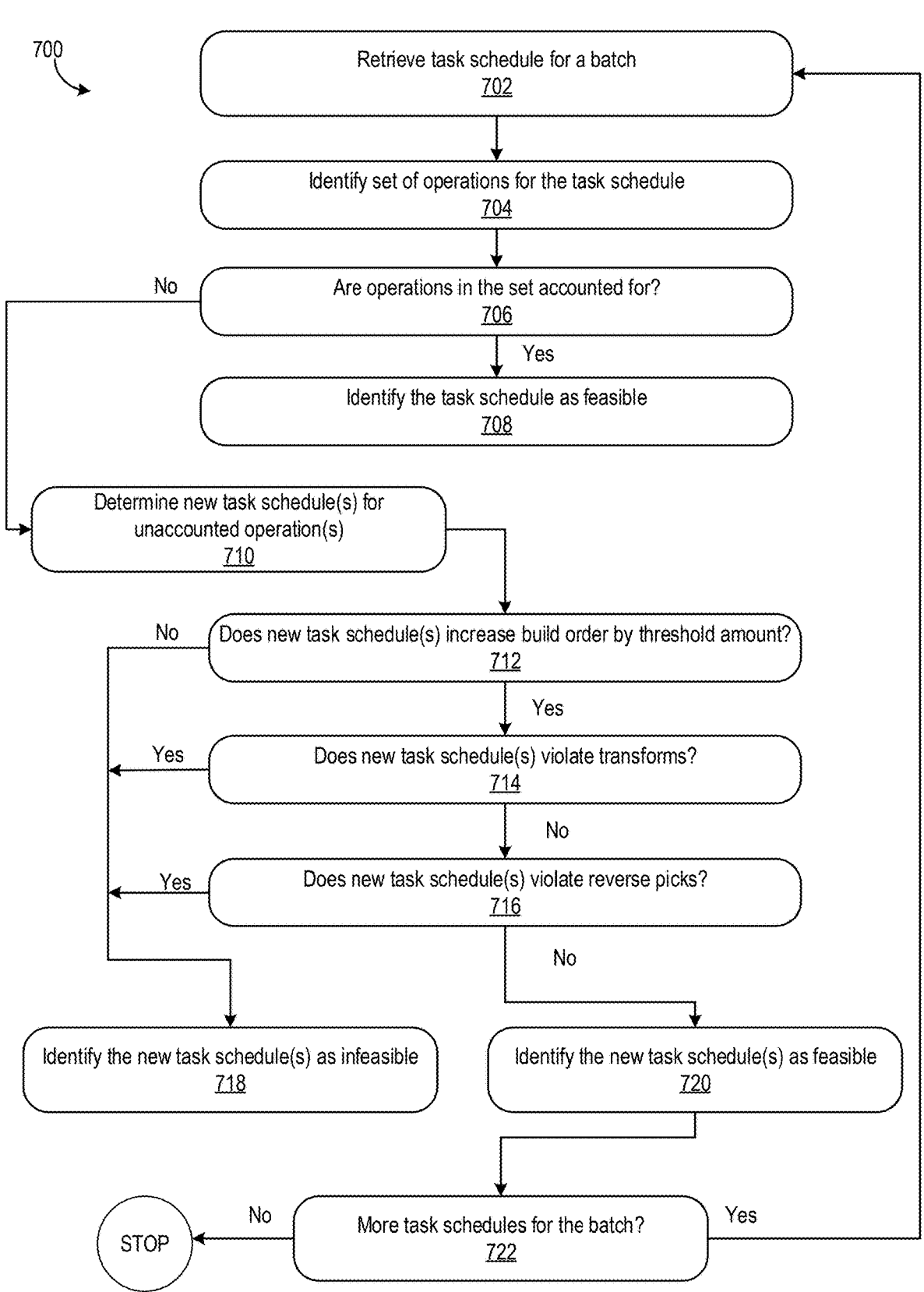

700

Retrieve task schedule for a batch
702

Identify set of operations for the task schedule
704

Are operations in the set accounted for?
706

No

Yes

Identify the task schedule as feasible
708

Determine new task schedule(s) for unaccounted operation(s)
710

Does new task schedule(s) increase build order by threshold amount?
712

No

Yes

Does new task schedule(s) violate transforms?
714

Yes

No

Does new task schedule(s) violate reverse picks?
716

Yes

No

Identify the new task schedule(s) as infeasible
718

Identify the new task schedule(s) as feasible
720

More task schedules for the batch?
722

No

Yes

STOP

FIG. 7

PLANNING AND CONTROLLING AUTOMATED LAYER PICKERS

INCORPORATION BY REFERENCE

This application claims priority to U.S. Provisional Application Ser. No. 63/298,625, filed on Jan. 11, 2022, the disclosure of which is incorporated by reference in its entirety.

TECHNICAL FIELD

This document describes technology for planning and controlling automated layer pickers, such as gantry layer pickers and/or robotic arm layer pickers.

BACKGROUND

Layer picking is a method of picking and moving layers of items from one pallet to another pallet. Pallets are generally flat transport structures that support items in a stable manner and that are adapted to fit forklifts and/or other devices/machines to move the pallets. Items are arranged in layers on a pallet, such as layers of cases (i.e., boxes of goods) that are stacked on top of each other. Layer picking is often performed on source pallets bearing homogenous or similar items are delivered, such as a pallet with layers of cases containing strawberries, and the picked layers are deposited on a destination pallet, which can combine full and/or partial layers of different types of items. Layer picking has been performed both manually and using automated robotic layer pickers. Robotic layer pickers, such as gantry layer pickers and robotic arm layer pickers, include a layer picking mechanism that is capable of grasping one or more layers from the top of a source pallet and moving those layers to a destination pallet. Robotic layer pickers may be limited to picking and depositing layers within a specified area, such as a picking area. For example, a gantry layer picker, which can rely on a picking head that is movable via a gantry system suspended above the picking area, may be limited to picking pallets that are located below and within the reach of the gantry system. Similarly, a robotic arm layer picker may be limited to picking layers from pallet positions that are arranged around the robotic arm.

SUMMARY

The document generally describes technology for planning and controlling automated layer pickers, such as gantry layer pickers and/or robotic arm layer pickers, so that they perform more efficient layer picking activities. For example, the throughput of automated layer pickers (i.e., the number of layers picked during a period of time, the number of pallets built/assembled during a period of time) can vary greatly depending on the efficiency of layer picking operations, including the operations performed by both the automated layer picker as well as other systems, such as automated systems to move pallets in and out of the layer picking area. For instance, source pallets that are positioned further from the destination pallet in a layer picking area can cause the automated layer picker to travel a further distance to build the destination pallet, which can reduce the throughput of the layer picker. In another example, an automated layer picker can have a limited pick area within which layers from source pallets can be picked and destination pallets can be built/assembled. Moving pallets in and out of layer picking area multiple times before being fully depleted or fully assembled can use more automated pallet moving resources, which can cause delays for other pallets moving in and out of the layer picking area as well as for pallets in other portions of a facility (e.g., warehouse) that rely on those systems as well. The disclosed technology can increase the efficiency of automated layer pickers and associated systems, such as automated pallet movers, by generating and controlling automated layer pickers to perform operations that increase and/or maximize the throughput of automated layer pickers.

More particularly, the disclosed technology can provide for determining arrangements of source pallets and destination pallets in the pick area and scheduling of pick tasks to optimize throughput in the storage facility. The disclosed technology can provide for determining, and iteratively modifying, batches of pallets (such as grouping together destination pallets that may require same items or items from a same source pallet), locations of pallets (such as relative positioning of source and destination pallets to reduce travel time and/or distance traveled between pallets), and task schedules (e.g., sequences of operations) for building destination pallets in the pick area. In other words, using the disclosed techniques, a computer system can make determinations that divide pick tasks into batches, assign pallets within these batches to locations in the pick area, and schedule the pick tasks (which may have variable start and end locations) for each batch. Determined batches, locations, and schedules can be assessed to determine whether they are feasible. If any of the batches, locations, and/or schedules pass the feasibility assessment, the disclosed technology can provide for scoring those batches, locations, and/or schedules. The disclosed technology can iteratively make adjustments to the batches, locations, and/or schedules, perform the feasibility assessment, and then score those that pass the feasibility assessment. The disclosed technology can then compare the scores for the iteratively adjusted batches, locations, and/or schedules to previously determined scores for batches, locations, and/or schedules to determine heuristic batches, locations, and/or schedules (e.g., batches, locations, and/or schedules whose scores are improvements over prior scores). The heuristic batches, locations, and/or schedules can be continuously optimized to determine heuristic solutions for a predetermined amount of iterations. Eventually (e.g., once the predetermined amount of iterations is completed), a best solution can be selected and provided to the automated layer picking system. In some implementations, the heuristic batches, locations, and/or schedules can be selected and provided to the automated layer picking system.

The pick area can be arranged in a grid layout in which an automated layer picking head (e.g., gantry head of gantry layer picker and/or gantry crane, picking head attached to robotic arm etc.) can move to various positions and pick items or layers from the source pallets in the grid layout to build the destination pallets, also in the pick area. Before layer picking can occur in the pick area, source pallets can be retrieved from storage areas in the facility. In automated warehouses, an automated storage and retrieval system (AS/RS) can retrieve the source pallets from storage racks and route them to the pick area (e.g., by conveyors and/or vehicles, such as shuttle vehicles). The automated layer picking head can be positioned above the pick area with the ability to move to various positions to pick up and/or drop off layers. Destination pallets can be placed at available locations in the pick area. To pick layers, the automated layer picking head can move to a position above a source pallet, move down, pick a layer and move up again. Then, the automated layer picking head with the picked layer can move to a position above the destination pallet, where the automated layer picking head can move down and place the layer on the destination pallet.

The technology described herein can improve performance of the automated layer picking head in the pick area. The performance can be defined in a variety of ways, such as a number of layers that the automated layer picking head can pick in an hour (or another predetermined period of time), which can be referred to as throughput. Due to a limited size of the pick area, the pick area may not contain all pallets for all orders (e.g., destination pallets) at the same time. Therefore, batches of tasks that can be processed together have to be made and source pallets need to be retrieved from and sent back to storage during the process. The throughput of the automated layer picking head may also depend on location assignment of pallets in the pick area and picking sequences of layers, since the throughput increases if a travel distance of the automated layer picking head decreases. Accordingly, the disclosed technology facilitates automated layer picking in a pick area by maximizing the throughput. The disclosed techniques can include batching of pick tasks, replenishment of source pallets from storage to the pick area, location assignment of the source and destination pallets in the pick area, and the automated layer picking head scheduling of picking tasks. As a result, destination pallets can be efficiently built in the pick area.

One or more embodiments described herein can include system for determining and controlling automated layer pick operations, the system having an automated layer picking system in a pick area of a warehouse, the automated layer picking system including a picking tool that can grasp and move one or more layers of cases from source pallets to destination pallets in the pick area, and a computer system in communication with the automated layer picking system. The computer system can receive, from a warehouse management system, a layer pick planning request for at least one order for items that are stored in the warehouse, retrieve, from a data store, information associated with the layer pick planning request that includes layer pick request data, inventory position data, task and carrier queue data, and status data about the automated layer picking system, and determine, based on the retrieved information, an initial feasible solution for completing the layer pick planning request. Determining the initial feasible solution can include determining initial batches of pallets based on grouping destination pallets that require layers of items from same source pallets, determining, based on the initial batches of the pallets, corresponding batch scores that can indicate a total amount of moves required to move the source pallets into the pick area for the automated layer picking system to execute the initial batches of pallets in the pick area, determining initial locations of the pallets in each of the initial batches based on assigning locations in the pick area to the source pallets and the destination pallets, determining, based on the initial locations of the pallets, corresponding location scores that can indicate a total amount of time required by the automated layer picking system to execute at least one of the initial batches of pallets in the pick area, determining an initial schedule for each of the initial batches based on determining an order of tasks for the automated layer picking system to execute to complete the initial batch, and determining, based on the initial schedule for each of the initial batches, a corresponding schedule score that can indicate a total distance traveled by the automated layer picking system to execute the tasks in the initial schedule. The computer system can also iteratively adjust the initial schedule for each batch to test alternative task schedules, iteratively adjust the initial locations of the pallets for each batch to test alternative locations based at least in part on the adjusted initial schedule, iteratively adjust the initial batches to test alternative batches based at least in part on the adjusted initial schedule and the adjusted initial locations, identify a heuristic solution for the layer pick planning request based on the alternative task schedules, the alternative locations, and the alternative batches, and return the heuristic solution for the layer pick planning request.

In some implementations, the embodiments described herein can optionally include one or more of the following features. For example, the automated layer picking system can be a gantry layer picking system. The picking tool can be a gantry head. Determining initial batches of pallets further can include determining an order for which the automated layer picking system to execute the initial batches. Determining initial locations of pallets can include assigning one or more source pallets required for a first destination pallet proximate an assigned location of the first destination pallet and assigning one or more other source pallets required for a second destination pallet proximate an assigned location of the second destination pallet. Sometimes, the location scores can indicate a total amount of time required by the automated layer picking system to execute a first batch and at least one subsequent batch. The location scores can also indicate a total amount of time required by the automated layer picking system to execute a first batch and at least one prior batch. Moreover, the location scores can indicate a total amount of time required by the automated layer picking system to execute a first batch, at least one prior batch, and at least one subsequent batch. In some implementations, the computer system can also generate output based on the heuristic solution for the layer pick planning request. Sometimes the computer system can generate instructions that, when executed, cause the automated layer picking system to execute tasks in the heuristic solution to complete orders that comprise the layer pick planning request.

As another example, the computer system can iteratively adjust the initial schedule for each batch to test alternative task schedules based on: moving at least one task in the initial schedule from a first execution time to a second execution time to generate an updated schedule, simulating completion of the schedule by the automated layer picking system to determine a total distance traveled by the automated layer picking system, generating an updated schedule score based on the total distance traveled by the automated layer picking system, determining whether the updated schedule score is an improvement over the schedule score of the initial schedule, identifying the updated schedule as a heuristic schedule based on a determination that the updated schedule score is an improvement over the schedule score of the initial schedule, and discarding the updated schedule based on a determination that the updated schedule score is not an improvement over the schedule score of the initial schedule. Additionally, the updated schedule score can be an improvement over the schedule score of the initial schedule if the updated schedule score is less than the schedule score of the initial schedule. Moving the at least one task can include swapping the at least one task with another task in the initial schedule. Moving the at least one task can also include inserting the at least one task into another execution timeslot in the initial schedule. In some implementations, the heuristic solution can include the updated schedule.

The computer system can also determine whether the updated schedule is feasible. Determining whether the updated schedule is feasible can include: identifying a set of operations for the updated schedule, determining whether the set of operations are accounted for in the updated schedule, and identifying the updated schedule as feasible based on a determination that the set of operations are accounted for. Moreover, the computer system can determine a new task schedule for unaccounted operations based on a determination that the set of operations are not accounted for, determine whether the new task schedule increases a build order by a threshold amount, determine whether the new task schedule violates at least one transform based on a determination that the new task schedule increases the build order by the threshold amount, determine whether the new task schedule violates reverse picks based on a determination that the new task schedule does not violate the at least one transform, and identify the new task schedule as feasible based on a determination that the new task schedule does not violate the reverse picks. The computer system may also determine that the new task schedule is infeasible based on a determination that (i) the new task schedule does not increase the build order by the threshold amount, (ii) the new task schedule violates the at least one transform, and (iii) the new task schedule violates the reverse picks.

The computer system can also iteratively adjust the initial locations of the pallets for each batch to test alternative locations based on assigning a source pallet in the batch to a location other than an assigned location of the source pallet in the initial locations to generate updated locations, simulating movement by the automated layer picking system between the updated locations to determine a total time to complete the batch by the automated layer picking system, generating updated location scores based on the total time to complete the batch, determining whether the updated location scores are improvements over the location scores of the initial locations, identifying the updated locations as heuristic locations based on a determination that the updated location scores are improvements over the location scores of the initial locations, and discarding the updated locations based on a determination that the updated location scores are not improvements over the location scores of the initial locations. Moreover, the updated location scores can be improvements over the location scores of the initial locations if the updated location scores are less than the location scores of the initial locations. The heuristic solution can also include the updated locations. The computer system can determine that the updated locations are feasible based on a determination that the updated locations of the source pallet are different than assigned locations of other pallets in the batch such that no two pallets are assigned a same location in the updated locations.

In some implementations, the computer system can iteratively adjust the initial batches to test alternative batches based on changing an order in which the initial batches are to be completed by the automated layer picking system to generate updated batches, simulating completion of the updated batches by the automated layer picking system to determine a total number of moves performed by the automated layer picking system to complete at least one of the updated batches, generating updated batch scores based on the total number of moves, determining whether the updated batch scores are improvements over the batch scores of the initial batches, identifying the updated batches as heuristic batches based on a determination that the updated batch scores are improvements over the batch scores of the initial batches, and discarding the updated batches based on a determination that updated batch scores are not improvements over the batch scores of the initial batches. Moreover, the updated batch scores can be improvements over the batch scores of the initial batches if the updated batch scores are less than the batch scores of the initial batches. The heuristic solution can include the updated batches. The computer system can also determine that the updated batches are feasible based on a determination that (i) the updated batches increase a build order by a threshold amount, (ii) the updated batches do not violate at least one transform, and (iii) the updated batches do not violate reverse picks.

Furthermore, the status data about the automated layer picking system can include (i) at least one of movement and location information about the picking tool, (ii) status information about a system that is configured to put source pallets in the assigned locations in the pick area, and (iii) information about whether the assigned locations in the pick area are filled with the source pallets and ready for picking.

The devices, system, and techniques described herein may provide one or more of the following advantages. For example, the disclosed technology can provide for planning layer picking activities in an automated layer picking system by minimizing travel distance of the automated layer picking head, maximizing throughput, timely and efficiently completing destination pallets (such as before delivery trucks arrive at the storage facility), and minimizing a number of source pallets entering or reentering the pick area.

The disclosed technology also provides for iteratively adjusting determined batches, pallet locations, and/or task schedules to maximize throughput. Therefore, the disclosed techniques can be flexible to real-time changes in orders and availability of source pallets to provide for dynamic adjustment of operations to be performed by the automated layer picking system. In some implementations, the disclosed technology can provide for determining layer picking activities for a batch of several hours of work and calculate a layer pick sequence for the batch. Additionally or alternatively, the disclosed technology can use an existing plan for layer picking activities and given a change to this plan (such as source pallet availability, a new rush order, etc.), locally and iteratively update the plan to determine and provide a new feasible solution for the automated layer picking system to continue its layer picking process. A change can occur to this plan with a carrier location update (e.g., a location of an arriving source pallet or an empty pallet is or has been updated) and/or a planning update (e.g., a set of tasks to execute by the automated layer picking system has to be or has been updated). The carrier location update can be triggered when a destination location of a source pallet to be placed by a vehicle is not available, a destination of an empty pallet to be placed by the automated layer picking head is not available, a vehicle fails, etc. The planning update can be triggered by an update to a pallet location, a source pallet not being available in the pick area (but may eventually become available), a source pallet not being available for delivery to the pick area (but may eventually become available), a rush order coming in, an automated layer picking head failure, etc. As a result, the disclosed technology can provide a continuous process for dynamically determining feasible plans (e.g., heuristic/optimal solutions) to maximize throughput in the layer picking process.

In another example, the disclosed technology provide computationally efficient mechanisms to determine and generate plans for controlling automated layer pickers and associated automated pallet moving systems. The number of possible permutations of different batches, pallet positions within a picking area, and then sequences of layer picking operations for a system to consider in generating a plan is incredibly large. For example, in an example gantry layer picker area with 200 pallet positions, just the number of possible arrangements of 200 pallets within this picking area is large ($200!=7.9\times10^{374}$). When layering in additional permutations based on different combinations of pallets within batches, and then different sequences of pick operations within each of these possible pallet positioning arrangements in the pick area, the number of possible permutations and options to be considered to arrive at an efficient solution is immense. A computer system considering each possible permutation and option would require significant computing resources (e.g., multitudes of dedicated CPUs, memory, network bandwidth, etc.) to determine a solution, and even with those resources a solution may not be determined in a practicable amount of time. The disclosed technology is able to generate plans in a manner that is computationally efficient and without considering all possible permutations— permitting for plans to be generated in a practicable amount of time and using a reasonable amount of computational resources.

The details of one or more implementations are set forth in the accompanying drawings and the description below. Other features and advantages will be apparent from the description and drawings, and from the claims.

BRIEF DESCRIPTION OF THE DRAWINGS

FIG. 3 is a flowchart of a process for determining heuristic batches as part of planning layer picking activities.

FIG. 4 is a flowchart of a process for determining heuristic locations for pallets in a pick area as part of planning layer picking activities.

FIGS. 6A-B are system diagrams of components that perform the techniques described herein.

FIG. 7 is a flowchart of a process for determining feasibility of a task schedule as part of planning layer picking activities.

Like reference symbols in the various drawings indicate like elements.

DETAILED DESCRIPTION OF ILLUSTRATIVE EMBODIMENTS

This document generally relates to technology for determining efficient layer picking activities for an automated layer picking system (e.g., gantry layer picking system, robotic arm layer picker) in a storage facility. Since a layer picking process in a pick area of the storage facility is a continuous process, the disclosed technology takes into account current plans for layer picking and layer pick requests from a warehouse management system (WMS) that should be added (such as at the end) of a current plan. Using information about the current plan(s) and the layer pick requests, the disclosed technology can generate a heuristic plan for determining which source pallets to transport from storage areas to the pick area and at what time(s), locations to place the retrieved source pallets in the pick area, locations to place destination pallets in the pick area, and in what order an automated layer picking head (e.g., gantry layer picker head, robotic arm with attached layer picking head) should bring layers from the source pallets to the destination pallets that are being built in the pick area.

Moreover, the disclosed technology can adapt existing plans for layer picking activities in the pick area, which can be based on real-time dynamic changes to the storage facility (e.g., source pallet availability, new rush order(s), etc.). An existing plan, for example, can be updated locally since other parts of the plan may not be directly affected by the real-time changes. The disclosed technology can iteratively adjust aspects of the existing plan, such as batches of pallets, locations of pallets, and task schedules, to determine heuristic batches, locations, and schedules. The heuristic batches, locations, and schedules can then be returned as a new plan to be executed by the automated layer picking system.

Figure 1A:
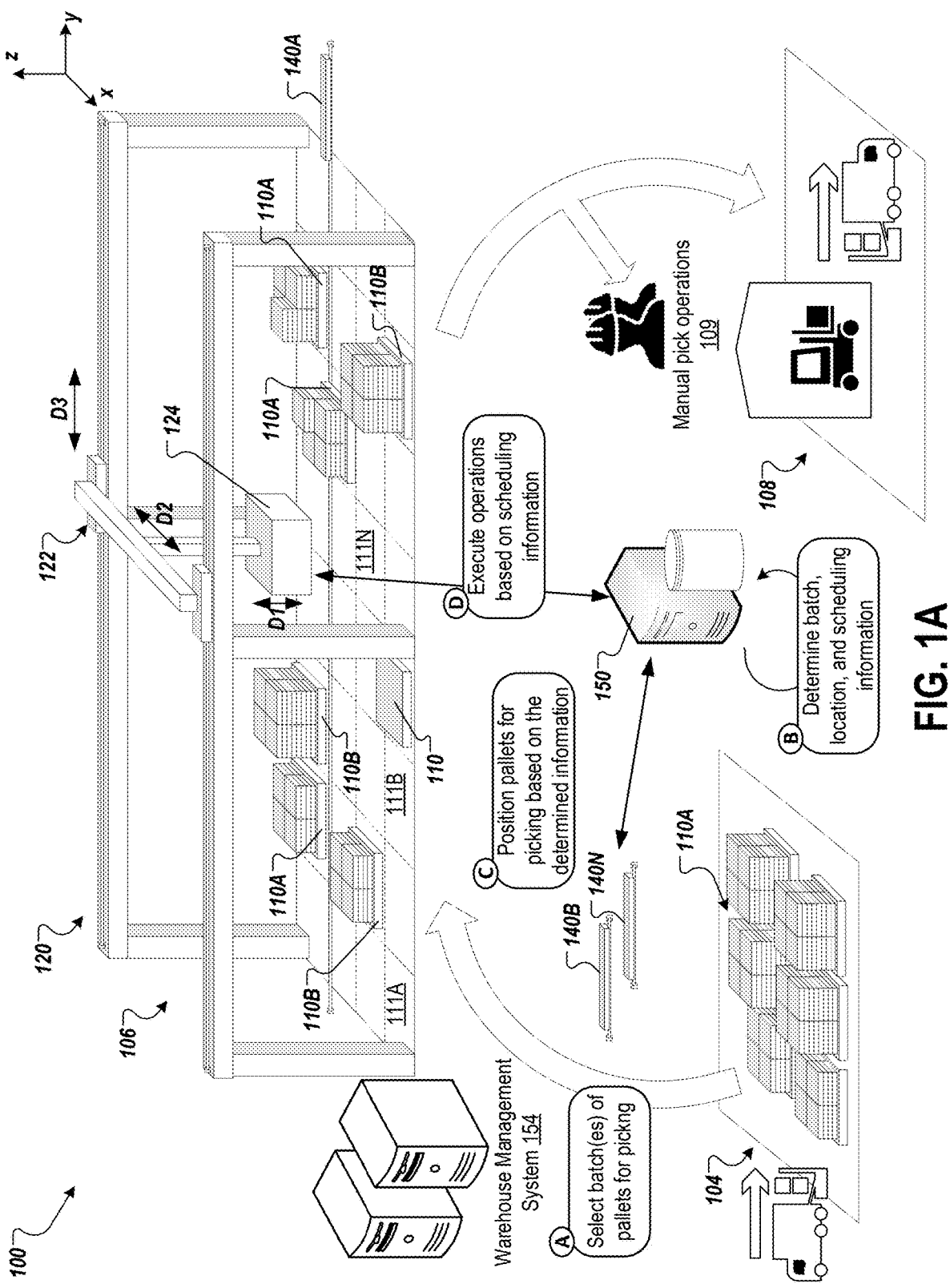
FIG. 1A is a conceptual diagram of an example system for planning layer picking activities and automatically assembling multiple pallets of items using the planned layer picking activities.

Referring to the figures, FIG. 1A is a conceptual diagram of an example system 100 for planning layer picking activities and automatically assembling multiple pallets of items using the planned layer picking activities. The system 100 may be implemented as part of a storage facility, such as a warehouse, a distribution center, a retail warehouse, a cold storage warehouse, an overseas warehouse, a packing warehouse, a railway warehouse, a canal warehouse, and other types of warehouses or facilities. The system 100 includes several areas for arranging pallets 110, such as a supply area 104, a pick area 106, and an output area 108. In some implementations, two or more of the areas 104, 106, and 108 can at least partially overlap.

The supply area 104 provides an area in which pallets 110 can be temporarily placed until they are transported to another storage area in the storage facility and/or the pick area 106. The supply area 104 may be a predetermined area of the storage facility, and/or another location remote from the system 100. In some implementations, trucks and other vehicles can transport the pallets 110 to the supply area 104.

The pick area 106 provides an area in which layers of items supported on the pallets 110, such as pallets 110A and 110B, can be moved and/or rearranged between and amongst the pallets 110. In addition or alternatively, layers of items supported on the pallets 110 in the pick area 106 can be moved to empty pallets 110, such as destination pallets, in the pick area 106 to create new pallets of items to be delivered to customers.

For example, source pallets 110A can be delivered from the supply area 104 to the pick area 106. Layers of items on the source pallets 110A can be picked up and moved onto one or more destination pallets 110B, which can then be discharged or routed by vehicles in the storage facility to the output area 108. The pallets 110 can be routed throughout the system by vehicles 140A-N. The vehicles 140A-N can be shuttle carts that move along rails that are integrated into portions of the system 100, such as in the pick area 106.

The system 100 can also include an automated layer picking system 120 (e.g., gantry layer picking apparatus, robotic arm layer picker) configured to lift, move, and drop layers of items over pallets 110 in the pick area 106, thereby building desired pallets 110 bearing layers of items from different pallets 110. For the simplicity of discussion throughout the remainder of this document, the automated layer picker is described as a gantry layer picking system, which is an illustrative example of an automated layer picking system. Discussions with regard to the gantry layer picking system apply to other types of automated layer picking systems, as well, such as automated robotic arm layer pickers and/or other automated layer picking systems, which are part of the disclosed technology. As described further below, a computer system 150 can determine heuristic layer picking activities that can be performed by the gantry layer picking system 120. Therefore, the gantry layer picking system 120 can be configured to, based on the determined heuristic layer picking activities, automatically identify a pallet of desired items, lift one or more layers of items from the pallet, and move and drop the layers onto a target pallet.

The gantry layer picking system 120 can include a gantry 122, as illustrated in FIG. 1A. The layer picking gantry 122 is built over the pick area 106 and can includes a gantry head 124 (e.g., layer grasping tool, crane, etc.) configured to grasp and release one or more layers of items using, for example, clamping and/or suction force. The gantry layer picking system 120 can, in some implementations, pick up 450 kg of weight. The system 120 can pick up one layer of items from a pallet. The system 120 can also pick of more than one layer of items from a pallet. The gantry 122 can include a tool drive mechanism configured to move the gantry head 124 vertically up and down (e.g., along direction D1 along axis Z), move it along a width of the pick area 106 (e.g., along direction D2 along axis X), and move it along a length of the pick area 106 (e.g., along direction D3 along axis Y). The gantry head 124 can therefore move at a maximum speed of on both the X axis and the Y axis, with acceleration and deceleration. Therefore, the time of moving between all locations 111A-N can be known and used with the disclosed techniques.

Alternatively or in addition, the gantry layer picking system 120 can include a robotic arm having a layer grasping tool or other type of gantry head at its distal end. The robotic arm can be positioned at a fixed location on the pick area 106, such as a center of the pick area 106, from which the robotic arm can reach all or some of the pallets 110 arranged therearound in the pick area 106. Alternatively, the robotic arm can be configured to be movable along one or more guide rails, or freely, in the pick area 106.

Alternatively or in addition, any other suitable devices for automated layer picking operations can be used for the gantry layer picking system 120. For example, in some implementations, the gantry layer picking system 120 can include automated vehicles dedicated or specifically designed for layer picking.

The output area 108 provides an area in which the pallets 110, such as the destination pallets 110B, that are transported out from the pick area 106 are arranged to be delivered to customers. The output area 108 may be a predetermined area of the system 100. In some implementations, trucks and other vehicles can transport the destination pallets 110B to the output area 108 and out from the output area 108.

As mentioned above, the system 100 can further include one or more vehicles 140A-N configured to pick up, carry, and drop pallets 110. The vehicles 140A-N can be configured to automatically move within the system, such as within the supply area 104, between the supply area 104 and the pick area 106, within the pick area 106, between the pick area 106 and the output area 108, and/or within the output area 108. The vehicles 140A-N can include carts that shuttle back and forth on rails, such as in the pick area 106 of the system 100. In some implementations, the vehicles 140A-N may be carts that move freely throughout different areas of the system 100.

In some implementations, the vehicles 140 include automated guided vehicles (automated vehicles). Examples of such automated vehicles include automated guided vehicles (AGVs) and self-driving vehicles (SDVs). For example, an automated vehicle can be configured to be an AGV that can be a portable robot that can automatically move and perform several tasks by following predetermined instructions with minimal or no human intervention. An automated vehicle can be a computer-controlled, unmanned electric vehicle controlled by pre-programmed software to move pallets around the storage facility. Alternatively or in addition, automated vehicles can work with guidance devices, such as magnetic tapes, beacons, barcodes, or predefined laser paths that allow the automated vehicles to travel on fixed or variable paths in a controlled space, such as in the pick area 106. Example guidance devices include marked lines or wires on the floor, and/or guidance by using radio waves, vision cameras, magnets, lasers, and/or other technologies for navigation. Automated vehicles can include lasers and/or sensors configured to detect obstacles in its path and trigger them to stop automatically.

The system 100 includes the computer system 150 and a warehouse management system (WMS) 154. The computer system 150 can be configured to control pallet assembly and/or transportation in the system 100. Although a single computer system 150 is illustrated and primarily described herein, multiple computing systems and/or devices can be configured to perform same or similar functions. The computer system 150 can be configured to communicate with the gantry layer picking system 120 (e.g., the gantry head 124), the WMS 154, and/or the one or more vehicles 140A-N in order to manage and optimize assembly of pallets in the system 100.

Still referring to FIG. 1A, automated gantry layer picking can occur in the pick area 106 with a given layout. In the pick area 106, destination pallets 110B (e.g., order pallets) can be constructed by the gantry head 124 of the gantry layer picking system 120, which can use instructions generated by the computer system 150 to pick layers of items from source pallets 110A (e.g., product pallets) that are also positioned in the pick area 106. The source pallets 110A can be pallets from a storage area in the storage facility of the system 100 consisting of a certain number of layers of a single item (e.g., product). Destination pallets 110A can be constructed pallets requested by one or more customers and can consist of a mix of layers of different items or of a single item with a quantity less than a full pallet. Customers may request a mix of several items with quantities less than a full pallet rather than a full pallet of a single item. Destination pallets 110B can therefore be constructed using the gantry layer picking system 120 by executing a set of tasks (e.g., order tasks), such as bringing x layers of item p to destination pallet b.

As shown in FIG. 1A, the pick area 106 can include several locations 111A-N where source and destination pallets 110A and 110B, respectively, can be placed and where the gantry head 124 of the gantry layer picking system 120 can pick or drop layers. The number of these locations 111A-N may be limited. In some implementations, not all source and destination pallets 110A and 110B, respectively, corresponding to all order tasks can be in the pick area 106 at the same time. Hence, not all order tasks can be executed in one operating cycle, but different batches of order tasks may be executed in different operating cycles. An operating cycle is a period of time in which a batch of order tasks to be executed is specified, and for this batch, a starting set-up of pallets contains all needed pallets. As a result, new pallets that are used for that batch of order tasks may not be brought into the pick area while the gantry head 124 is executing the batch of order tasks. Source pallets 110A may have to be retrieved from the storage area (e.g., the supply area 104) and brought to the pick area 106 when needed in the operating cycle, then sent back when all order tasks concerning the pallet are executed.

To automate gantry layer picking and maximize throughput of the gantry layer picking system 120, the following decisions can be performed and optimized by the computer system 150 using the disclosed techniques: batching of order tasks that can be executed together, replenishing source pallets 110A from the supply area 104 to the pick area 106, assigning locations 111A-N of source and destination pallets 110A and 110B, respectively, in the pick area 106, and scheduling order tasks. These decisions can be integrated into a model that uses a number of order tasks to execute as input and provides the decisions for batching of order tasks, location assignment, and task scheduling as output. From the three output decisions, a replenishment strategy may also be derived by the computer system 150 in order to make sure each pallet is at the pick area 106 when it is needed. Hence, the model formulating automatic gantry layer picking can integrate order task batching, location assignment, and task scheduling to ensure efficiently and timely building of destination pallets 110B in the pick area 106 of the storage facility in the system 100.

A destination pallet 110B can start as an empty pallet, in some implementations. Sometimes, the destination pallet 110B can be a source pallet 110A that was depleted, that is, all supplied layers of the source pallet 110A have been picked. When the destination pallet 110B has a corresponding (consecutive) order task(s) that (together) may require(s) an exact number of layers of a certain item that are present on a source pallet 110A in the pick area 106 and no other order task corresponding to the destination pallet 110B is executed yet, the destination pallet 110B can also start by transforming that source pallet 110A into the destination pallet 110B. From the entrance of the pick area 106, source pallets 110A can be brought to assigned locations 111A-N in the pick area 106 by the vehicles 140A-N. At the beginning of an operating cycle, for example, a set of source pallets 110A required for order tasks in a batch can be put into position in the pick area 106.

Still referring to FIG. 1A, the WMS 154 can select one or more batches of source pallets 110A for picking in block A. The WMS 154 can, for example, receive and process customer orders. The customer orders can indicate what items and/or quantities of items are requested. The WMS 154 can then identify source pallets 110A in the supply area 104 that satisfy the requirements in the customer orders. Information for the identified source pallets 110A can be transmitted from the WMS 154 to the computer system 150, which can use this information to determine batch, location, and scheduling information for each of the customer orders (block B). Refer to FIG. 1A for additional discussion about determining the batch, location, and scheduling information.

The computer system 150 can also transmit instructions to the vehicles 140A-N to position the source pallets 110A for picking in the pick area 106 based on the determined information (block C). The vehicles 140A-N can, for example, move the source pallets 110A from the supply area 104 to one or more assigned locations 111A-N in the pick area 106. As described above, the vehicles 140A-N in the pick area 106 can be positioned on rails and can shuttle back and forth in aisles between the locations 111A-N to place the source pallets 110A. Refer to FIG. 1C for additional discussion about layout of the pick area 106.

The computer system 150 also may generate instructions for executing a layer picking process by the gantry layer picking system 120. The instructions can include operations to be executed by the gantry head 124 based on the determined scheduling information (block D). Therefore, once the source pallets 110A are positioned in the locations 111A-N in the pick area 106, the gantry head 124 can execute operations in the determined scheduling information to pick layers of items from the source pallets 110A and place them on the destination pallets 110B, which are also assigned to locations 111A-N in the pick area 106.

Once the destination pallets 110B are built by the gantry head 124, the vehicles 140A-N can route the destination pallets 110B to the output area 108. In some implementations, one or more of the destination pallets 110B can also be routed to and used in manual pick operations 109. For example, the destination pallets 110B can be routed to a manual pick area in the system 100 where human workers can build partial pick layers (e.g., loose picking cases) using these destination pallets 110B. Therefore, the disclosed techniques can be used to build full pallets that go out to customers and also pallets that can be used internally in the system 100 to replenish pallets that are used to complete customer orders.

Figure 1B:
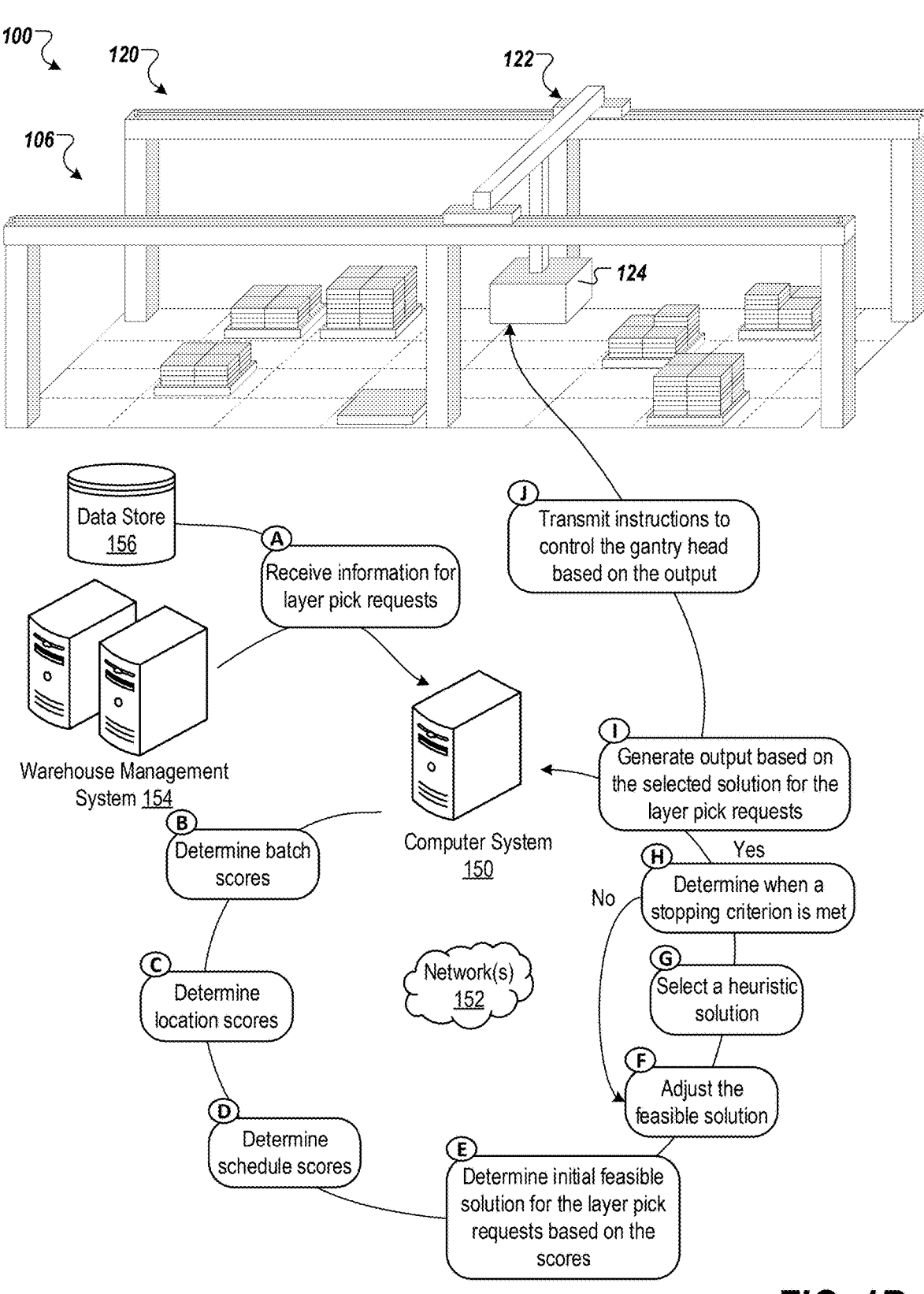
FIG. 1B is a conceptual diagram of the example system for planning layer picking activities.
Figure 1C:
FIG. 1C is a top-down view of an example pick area where layer picking activities may occur in a storage facility.

FIG. 1B is a conceptual diagram of the example system 100 for planning layer picking activities. As shown, the computer system 150, the WMS 154, and a data store 156 can communicate via network(s) 152. The computer system 150 can receive information for layer pick requests from the WMS 154 and/or the data store 156 (block A).

Using the received information, the computer system 150 can determine batch scores in block B. The information for layer pick requests can include tasks to complete for each customer order, which can be referred to as order tasks. The order tasks can be divided into batches. In some implementations, the computer system 150 can assign order tasks to a same batch in a same operating cycle if the order tasks require a same item. The computer system 150 can keep assigning the order tasks to the same batch until the needed source pallets 110A for these order tasks reach a maximum capacity of the pick area 106 and/or until all order tasks corresponding to that item are assigned. When all order tasks corresponding to an item are assigned and the number of source pallets 110A in the pick area 106 has not reached the maximum yet, order tasks corresponding to another item can be assigned to batches. Each batch determination can be assessed for feasibility (e.g., refer to FIG. 7) and then assigned a batch score. As described further in reference to blocks F—H, the computer system 150 can modify or adjust the determined batches, assess their feasibility, determine their corresponding batch scores, and determine whether these new batch scores are improvements over prior batch scores. Batches whose batch scores are improvements over prior batch scores can be selected as part of a heuristic solution for completing the layer picking requests.

Still referring to block B, as part of determining the batch scores, the computer system 150 can divide the order tasks into batches that correspond to operating cycles. The number of operating cycles may be unknown beforehand, and the computer system 150 may keeps adding operating cycles as long as needed until all order tasks can be executed for the layer picking requests. In some implementations, starting with adding a random order task from a random item, and its corresponding source pallets 110A, to a first batch, the computer system 150 can keeps adding order tasks corresponding to that item in a random order to the batch until a maximum number of pallets in the pick area 106 is reached and/or until all order tasks corresponding to that item are assigned. If all order tasks from an item are assigned, a new item can be selected randomly among all items that have non-assigned order tasks. When there are still enough locations 111A-N available in the pick area 106, order tasks and source pallets 110A concerning a next item can be added to the current, first batch. A destination pallet 110B corresponding to the selected order task can be added. A source pallet 110A corresponding to the selected item can also be added if the item's cumulative requested layers of tasks in the batch are more than the item's cumulative supplied layers of source pallets 110A in the batch. If the pallets that should be added to the batch cannot be added, a new batch can be created, and the order task, together with the source and destination pallets 110A and 110B, respectively, can be added to the new batch. The process of adding order tasks to batches can be repeated until all order tasks are assigned to a batch. In some implementations, a resulting number of batches can be equal to a total number of operating cycles.

In some implementations, a maximum number of pallets does not need to be equal to a number of pallet locations 111A-N in the pick area 106, since a certain number of locations 111A-N can be intentionally left empty each operating cycle. Leaving one or more of the locations 111A-N empty can provide an ability for the vehicles 140A-N to set up for a next operating cycle while a current operating cycle is being performed by the gantry layer picking system 120.

The computer system 150 can also determine location scores in block C. Each location determination can be assessed for feasibility (e.g., refer to FIG. 7) and then assigned a location score. As described further in reference to blocks F—H, the computer system 150 can modify or adjust the determined locations for pallets, assess feasibility of each determined location, determine location scores for each of the locations that pass the feasibility assessment, and determine whether these new location scores are improvements over prior location scores. Locations whose location scores are improvements over prior location scores can be selected as part of a heuristic solution for completing the layer picking requests.

In some implementations, locations for the pallets that are needed in each operating cycle can be assigned randomly with equal probability given to each of the available locations 111A-N. This random location assignment can be used since strategically assigning the pallets to locations may require a task schedule as input, which is not yet generated. Hence, in order to maintain processing efficiency, pallets can be assigned to random locations and the task schedule can then be determined in block D, described below.

In block D, the computer system 150 can determine schedule scores. Each task schedule determination, such as a task swap or swap insertion (e.g., refer to FIGS. 5A-B) can be assessed for feasibility (e.g., refer to FIG. 7) and then assigned a schedule score. As described further in reference to blocks F—H, the computer system 150 can modify or adjust the determined task schedules, assess their feasibility, determine their corresponding schedule scores, and determine whether these new schedule scores are improvements over prior schedule scores. Task schedules whose schedule scores are improvements over prior schedule scores can be selected as part of a heuristic solution for completing the layer picking requests.

Therefore, in block D, the computer system 150 can determine a schedule of order tasks for each operating cycle. Starting with a starting location, a closest source pallet 110A that can be used to execute a non-executed order task can be determined. Then, from a location of that source pallet 110A closest to a destination pallet 110B that has a non-executed order task that needs a picked item can be determined such that a corresponding pick order task can be executed. If there are multiple equally good options to task ordering, one of those options can be chosen randomly. From the location of the destination pallet 110B, a closest source pallet 110A can be determined and the process described herein can be repeated until all order tasks corresponding to the operating cycle can be executed.

Next, the computer system 150 can determine at least one initial feasible solution for the layer pick requests based on the batch scores, location scores, and schedule scores (block E). As described herein, batching of order tasks (block B), assigning locations of pallets per batch (block C), and task scheduling of order tasks per batch (block D) can be performed sequentially since location assignment of pallets can require a known batch of pallets per operating cycle as input, and task scheduling may require locations of the pallets as input. For given locations and batching of order tasks in the initial solution, a heuristic schedule of order tasks per operating cycle can be determined, as described in reference to FIGS. 5A-B.

The computer system 150 can also adjust the initial feasible solution in block F and select a heuristic solution in block G, as described further below. The heuristic solution can be a good solution, but may not always be a best solution. The heuristic solution can also be an optimal solution.

The computer system 150 can, in some implementations, determine a division of order tasks among operating cycles. For each division of order tasks, the computer system 150 can determine heuristic locations for the pallets and a heuristic schedule of tasks in a given batch of order tasks. A resulting heuristic solution can be fed back to improve batching determinations as well as locations and/or scheduling determinations. As an example, a heuristic schedule can be determined based on iteratively performing one or more scheduling moves on the initial feasible solution (e.g., swaps and/or insertions, as described in FIGS. 5A-B). After each scheduling move, for a new schedule that may be selected as the heuristic solution, a best assignment of order tasks to source pallets that are present in each operating cycle can be determined. Since only a limited number of source pallets of a same item are present in each operating cycle, a best solution can be determined by considering a set of possible combinations, such as all possible combinations. This process can be performed to determine the heuristic schedule.

The heuristic schedule (e.g., a best solution for scheduling) can then be used as input to determine heuristic locations. The heuristic locations can be determined by iteratively adjusting locations in the initial feasible solution until a maximum number of non-improving location moves are made, further based on the determined heuristic schedule. A count of non-improving moves can increase by a predetermined amount if a location score, after performing the move, is higher than before performing the move. This process can be used to determine the heuristic locations for the heuristic solution.

Similarly, the heuristic locations can be used as input to determine heuristic batches. The same process can be repeated for determining heuristic batches. The heuristic batches can be determined by iteratively adjusting batches in the initial feasible solution until a maximum number of non-improving batch moves are made, further based on the determined heuristic locations (and optionally the heuristic schedule). A count of non-improving moves can increase by a predetermined amount if a batch score, after performing the move, is higher than before performing the move. This process can be used to determine the heuristic batches for the heuristic solution.

It can be noted that the heuristic solution can be updated each time that a best solution, such as a heuristic schedule and/or heuristic locations, is identified, in order to show the full potential of next possible moves. For a change of locations, for example, first the heuristic schedule can be updated accordingly before a next location move can be evaluated to determine an updated heuristic location or locations. For similar reasons, the heuristic schedule and heuristic locations can be determined first before a first batching move of the initial feasible solution is performed. Therefore, the initial batching of tasks can be evaluated more accurately and efficiently using newly determined heuristic schedules and/or heuristic locations.

In block H, the computer system 150 can determine whether a stopping criterion is met. If the criterion is not met, the computer system 150 can continue to iterate through blocks F and G until the stopping criterion is met. Once the criterion is met, the computer system 150 can proceed to block I. The stopping criterion can be a predetermined number of iterations for adjusting the initial solution. One or more other criterion can also be used in block H.

Figure 6B:
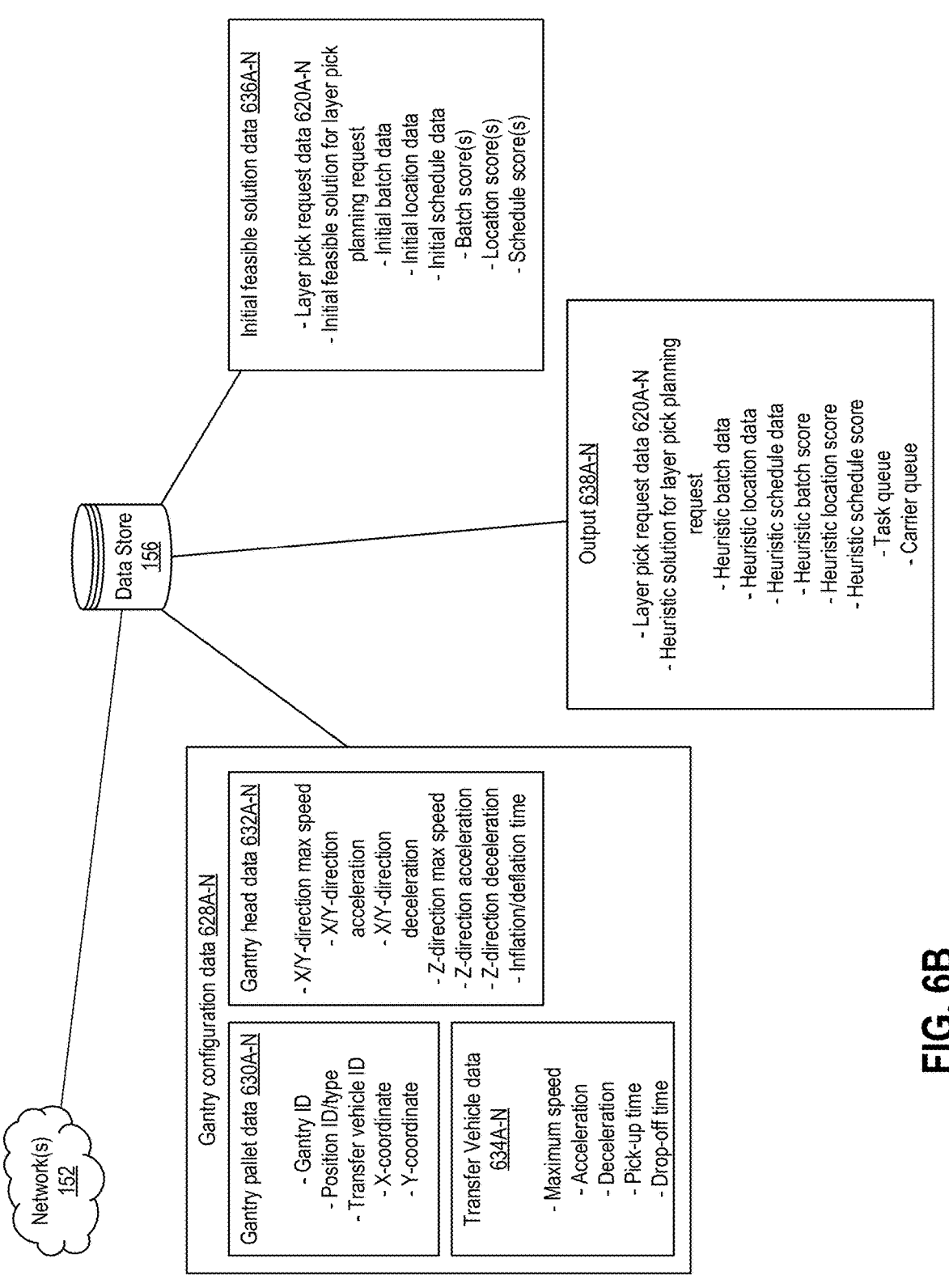

In block I, the computer system 150 can generate output based on the selected heuristic solution for the layer pick requests. Generating the output can include generating instructions for controlling the gantry layer picking system 120, the vehicles 140A-N, and/or other components in the system 100. The output can also indicate information about the selected heuristic solution, which can be transmitted to one or more other computing systems, such as the WMS 154, to determine instructions to be performed by other components of the system 100. Refer to FIGS. 6A-B for additional discussion about output that can be generated by the computer system 150 in block I. Finally, the computer system 150 can transmit instructions to control the gantry head 124 based on the output (block J). The computer system 150 can also transmit instructions to control components of the gantry layer picking system 120 to one or more other computing systems in the system 100.

FIG. 1C is a top-down view of an example pick area 106 where layer picking activities may occur in the example system 100. The pick area 106 can include aisles 160A-C positioned between locations 166A-N(e.g., refer to the locations 111A-N in FIG. 1A). Source and destination pallets, as described in reference to FIGS. 1A-B, can be positioned in any of the locations 166A-N. Source pallets, for example, can be routed down a conveyor system 162A and/or 162B from supply and/or storage areas throughout the system 100. The pallets that arrive from the conveyor systems 162A and/or 162B can then be automatically lowered onto hold blocks 164A-H so that the pallets are at an appropriate height for retrieval by the vehicles 140A-C (e.g., rail-guided vehicles). The vehicles 140A-C can shuttle back and forth in the aisles 160A-C, pick up the pallets at the hold blocks 164A-N, and move those pallets to appropriate locations 166A-N in the pick area 106.

Determinations made by the computer system 150, as described in FIGS. 1A-B, can then be used to control gantry heads 124A and 124B on respective layer picking gantries 122A and 122B of the gantry layer picking system 120. For example, the gantry heads 124A and 124B can be independently moved along a length of the respective layer picking gantries 122A and 122B and raised and lowered to pick layers from pallets and put the picked layers on pallets in the locations 166A-N. The layer picking gantries 122A and 122B can also be independently moved along lengths of the gantry layer picking system 120 (e.g., from a left to a right side of the pick area 106) so that the gantry heads 124A and 124B can access pallets at various different locations throughout the pick area 106, such as the locations 166B and 166C.

Figure 2A:
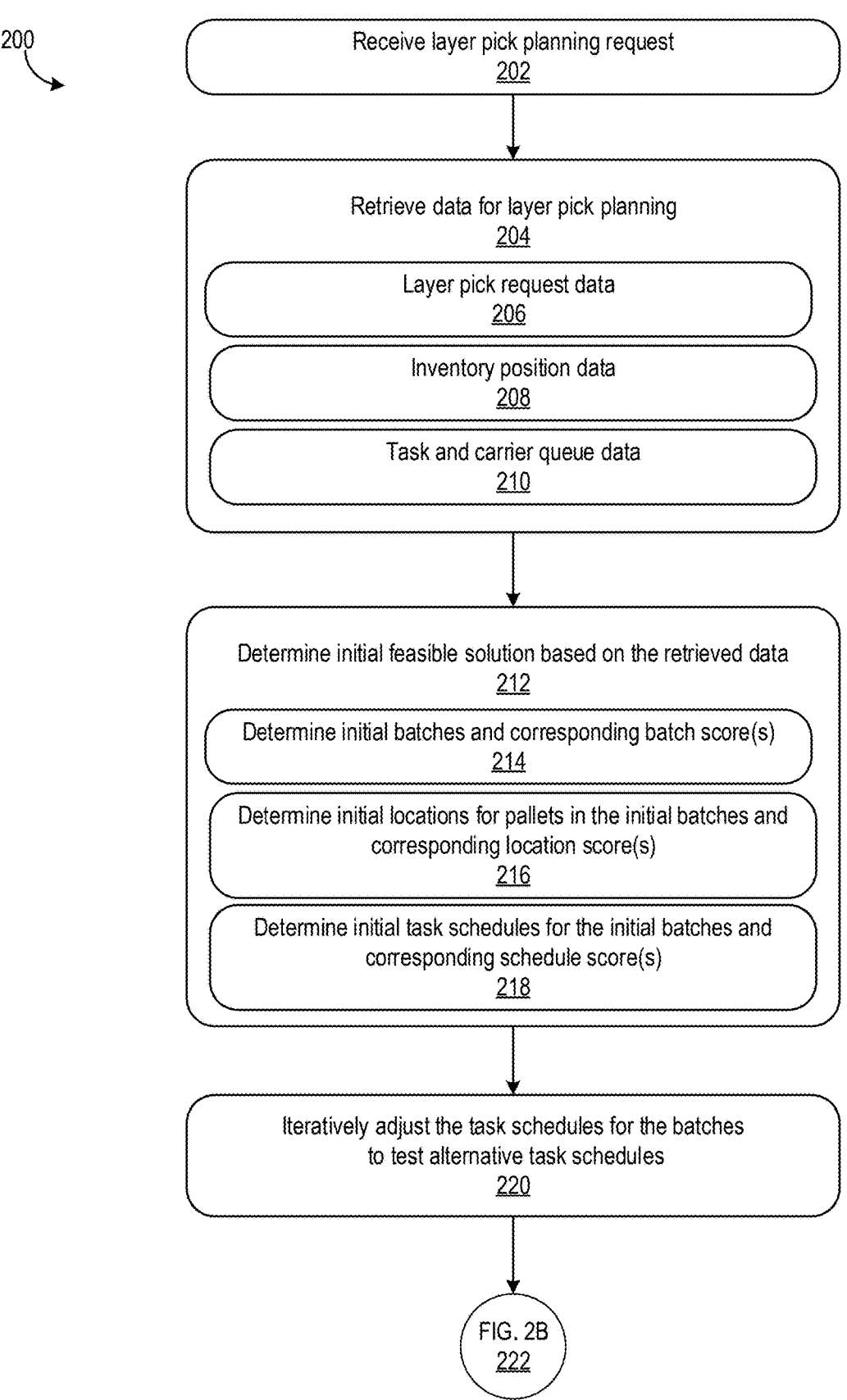
FIGS. 2A-B is a flowchart of a process for determining heuristic layer picking activities for a gantry layer picking system in a storage facility.
Figure 2B:
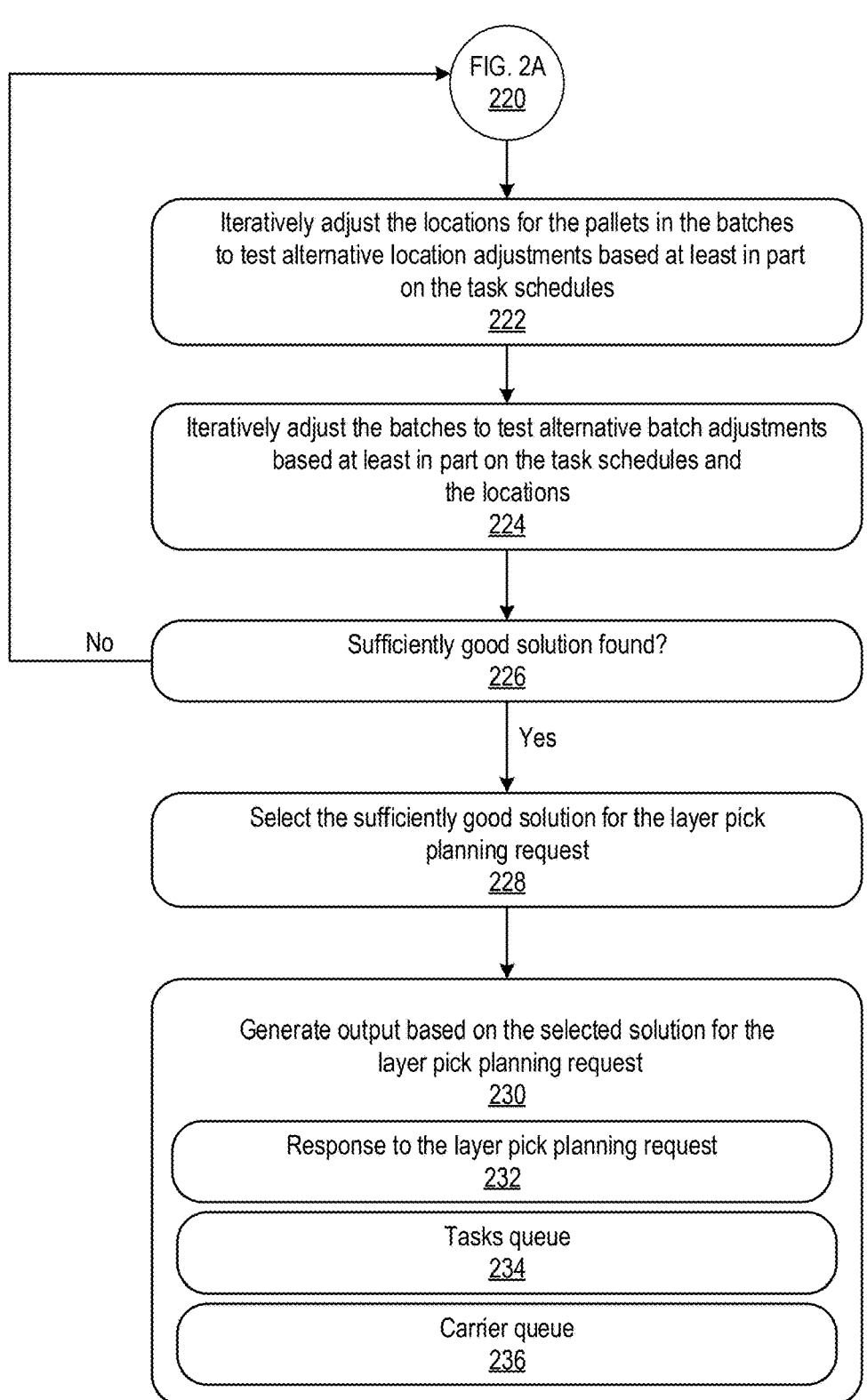

FIGS. 2A-B is a flowchart of a process 200 for determining heuristic layer picking activities for a gantry layer picking system in a storage facility. The process 200 can be performed by the computer system 150. The process 200 can also be performed by one or more other computing systems, devices, computers, networks, cloud-based systems, and/or cloud-based services. For illustrative purposes, the process 200 is described from the perspective of a computer system.

Referring to the process 200 in both FIGS. 2A-B, the computer system can receive at least one layer pick planning request in block 202. Refer to FIGS. 1A-B and FIGS. 6A-B for additional discussion about receiving the at least one layer pick planning request. In brief, the layer pick planning request can be a request to build a pallet for a customer with layers of certain items. The request can also indicate if any of the layers and/or items in the customer's order are interchangeable. The computer system can then determine how best to build a destination pallet for that particular customer's order using the disclosed techniques.

In block 204, the computer system can retrieve data for layer pick planning based on the received request. For example, the computer system can retrieve layer pick request data (block 206), inventory position data (block 208), and task and carrier queue data (block 210). In some implementations, the data described in blocks 206-210 can be transmitted to the computer system in block 202 with the layer pick planning request. The layer pick planning request and the data can be received from the WMS 154, the data store 156, and/or one or more other data stores and/or computing systems in communication with the computer system. Refer to FIGS. 6A-B for additional discussion about the retrieved data.

Next, the computer system can determine an initial feasible solution based on the retrieved data (block 212). This determination can include determining initial batches and corresponding batch scores (block 214), determining initial locations for pallets in the initial batches and corresponding location scores (block 216), and determining initial task schedule(s) for the initial batches and corresponding schedule scores (block 218).

The initial batches that are determined in block 214 can be groups of pallets, such as destination pallets for one or more layer pick planning requests, that can be built during a same operating cycle (e.g., at a same time). For example, destination pallets for different orders that require layers from a source pallet of beef can be grouped together in a batch since completing the layers of beef for those destination pallets at once can be more efficient than building those destination pallets at different times or during different operating cycles. Determining the initial batches can include determining whether the initial batches are feasible. The initial batches can be considered feasible, by the computer system, if fewer pallets in a batch are positioned in a pick area than there are locations available in the pick area. Refer to FIG. 7 for additional discussion. It can be efficient and throughput-maximizing if a batch of pallets can be built while keeping some locations in the pick area available. Some of the locations can be kept open in the event that additional pallets, such as for rush orders, need to be added to the current operating cycle. Keeping open some of the locations can also be beneficial to ensure that empty destination pallets for a next operating cycle can be put into those empty locations so that the next operating cycle can be performed immediately after completion of the current operating cycle, without lag time between cycles. In some implementations, a batch can include approximately 20 orders. Additional or fewer orders can be included in a batch as long as some locations may remain open.

To determine the initial batches, the computer system can add pallets to a batch so long as locations are available to receive the pallets in the pick area. If locations are not available, then the pallets can be added to a new batch. Moreover, pallets that may be needed to build destination pallets in a next operating cycle or in the future can be added to one or more new batches.

Additionally, the batch scores for the initial batches can be determined in block 214 based on how many moves may be required in the pick area to complete a batch. Moreover, the batch scores can indicate how many moves may be required to move the source pallets for the batch into the pick area so that the gantry layer picking system can then execute the batch. The batch scores can be a numeric value indicating a number of moves in the pick area for the batch (e.g., moves in and out of the pick area by the gantry layer picking system). Accordingly, a lower batch score can be preferred and considered an improvement over a higher batch score because the lower batch score can indicate fewer moves being made for the particular batch.

In some implementations, batch scores for one or more batches can be decreased or lowered based on a determined order of the batches. For example, the computer system can determine batches 1, 2, and 3 and order them as 1, 2, and 3. If the computer system orders the batches as 1, 3, and 2, the batch score for each of the batches can be reduced because batches 1 and 3 may require layers from a same source pallet. Thus, by leaving the same source pallet in the pick area so that both batches 1 and 3 can be completed sequentially, a total number of moves in and out of the pick area are reduced (after all, the source pallet can remain in the pick area while two batches are prepared). On the other hand, if the batches are prepared in the order of 1, 2, and then 3, when batch 1 is complete, the gantry layer picking system would have to make additional moves to move the source pallet for batches 1 and 3 out of the pick area to make room for source pallets for batch 2. When it is time to complete batch 3, the gantry layer picking system would then have to make additional moves to bring the source pallet for batches 1 and 3 back into the pick area, thereby resulting in more moves than if the batches are ordered as 1, 3, and then 2. Therefore, the ordering of batches, as determined by the computer system in block 216 can also impact the batch scores.

In block 216, the computer system can determine locations for each pallet in a batch within the pick area. In other words, the computer system can determine and assign specific locations in the pick area to each source pallet in a batch that is used to build one or more destination pallets. The computer system can also determine whether the initial locations are feasible before considering them as part of the initial feasible solution. Refer to FIG. 7 for additional discussion about the feasibility assessment. Once the computer system determines locations for pallets in a first batch, the computer system can determine locations for pallets in a second batch and so on, for each remaining batch of pallets. Sometimes, a source pallet may not be completely depleted for the first batch, so the computer system can determine that source pallet should remain in its assigned location for the next batch to be completed in the pick area. That source pallet may then be removed from the pick area, or used as a destination pallet, once the source pallet is completely depleted of its layers. The computer system can assign source pallets to locations that are close to locations of destination pallets requiring layers from those source pallets, which can reduce a total amount of time needed to complete a batch and/or subsequent batches. For example, a customer's destination pallet can require two layers of beef, one layer of canned peas, and one layer of carrots. The computer system can assign a source pallet of beef to a location that is proximate, adjacent, or otherwise near an assigned location of a source pallet of canned peas, an assigned location of a source pallet of carrots, and/or an assigned location of the destination pallet. Therefore, when the gantry layer picking system builds the customer's destination pallet, the gantry may travel a shorter distance, and therefore use less time, to pick the abovementioned layers and complete building the destination pallet. This can maximize throughput and improve efficiency in the picking and pallet building process.

Additionally, the location scores for the initial locations can be determined in block 216 based on estimated time needed to execute a batch. A location score can, for example, be a numeric value indicating an estimated time to build all destination pallets in the batch. The location score can, additionally or alternatively, be a numeric value indicating an estimated total time for completing batches that are ordered before and/or after each other. A lower location score can indicate less time needed to complete the batch or batches than a higher location score. The estimated total time can indicate potential inefficiencies that may be experienced in the pick area if the batches are executed in that order. The computer system can run simulations to estimate how long it would take to complete a batch, one or more batches before the batch, one or more batches after the batch, and/or any lag time between the batch(es).

For example, the computer system can run simulations to estimate how long it takes to complete batches in the order of 1, 2, and 3, which can be initial locations determined in block 216. The computer system can assign a location score to each of the batches, which can be impacted by the order of these batches. The location scores for the batches can be high values because it can take more time to complete the batches in this order than if the batches are ordered as 1, 3, and then 2. In some implementations, location scores can be incremented by location scores of adjacent batches. For example, in the example of batches in the order of 1, 2, and 3, batch 2 can have a location score that is incremented by the location scores of 1 and 3. Thus, if it takes a significant amount of time to complete batches 1 and 3, then batch 2's location score can be increased to reflect the inefficiencies in completing the batches in the order of 1, 2, and 3.

In block 218, the computer system can determine initial task schedules that can reduce a total distance traveled (e.g., lateral distance) by the gantry layer picking system to build the destination pallets for a batch in the pick area. The computer system can also determine whether the initial task schedules are feasible before considering them as part of the initial feasible solution. Refer to FIG. 7 for additional discussion about the feasibility assessment. The computer system can run simulations to estimate the total distance traveled to complete each batch. The computer system can simulate what pallets need to be built in a batch (based on the initial batches determined in block 214) and placement of the pallets for the batch in the assigned locations of the pick area (based on the initial locations determined in block 216). Then the computer system can simulate an order of tasks to perform to complete the batch, which can be referred to as an initial task schedule. The computer system can assess and quantify a total distance traveled by the gantry layer picking system when performing the simulated order of tasks. The total distance traveled can be used to determine the schedule score for that simulated order of tasks.

Accordingly, the schedule scores for the initial task schedule(s) can be determined in block 218 based on estimated travel distance to complete the batch. The schedule scores can be assigned numeric values indicating total estimated travel distance. A lower schedule score can indicate less distance traveled by the gantry layer picking system while a higher schedule score can indicate more distance being traveled.

As described herein, the initial batches, initial locations, and initial schedules can be sequentially determined since each determination can be provided as input to a next determination in order to generate the initial feasible solution. In other words, the initial batches can be used as input to determine, by the computer system, the initial locations, and the initial locations can then be used as input to determine, by the computer system, the initial schedule(s).

Once the initial feasible solution is determined, the computer system can iteratively adjust one or more of the batches, locations, and/or task schedule(s) to determine a heuristic solution. The heuristic solution can be a best or optimal solution for efficiently picking and building destination pallets in the pick area to maximize throughput. Once the batches, locations, and/or task schedules are iteratively adjusted, the computer system can evaluate the adjustments and determine whether they are an improvement over prior adjustments and/or the initial batches, locations, and/or task schedules. Iterative adjustments that are improvements can be selected as part of the heuristic solution. As described herein, the computer system can iteratively adjust the task schedule(s) first, then adjust the locations based on the adjusted task schedule(s), and then adjust the batches based on the adjusted locations.

For example, the computer system can iteratively adjust the task schedule(s) for the batches to test alternative task schedules in block 220. Initially, the computer system can iteratively adjust the task schedule(s) for the initial batches. Subsequently, the computer system can iteratively adjust the task schedule(s) for any new batches that are determined and/or initial batches that are modified/iteratively adjusted. When iteratively adjusting the task schedule(s), the computer system can seek to minimize total distance traveled by the gantry layer picking system to complete the batch. To iteratively adjust a task schedule, the computer system can swap, move, or otherwise insert one or more tasks in the schedule for the batch (refer to FIGS. 5A-B). The computer system can then determine whether the swap, move, or insertion is feasible (refer to FIG. 7), and if it is feasible, the computer system can score the adjusted task schedule. The computer system can determine whether the score for the adjusted schedule is an improvement over the score for the initial task schedule and/or other schedules that were previously updated/adjusted. The computer system can continue to iteratively adjust the task schedules as described here to determine which alternative task schedule can be optimal, preferred, or otherwise an improvement over other task schedules. The optimal, preferred, or improved task schedule can have a lowest estimated travel distance by the gantry layer picking system to complete the batch.

In block 222, the computer system can iteratively adjust the locations for the pallets in the batches to test alternative location adjustments based at least in part on the task schedules. To iteratively adjust the locations, both the operating time of the gantry head and a setup time associated with location assignments can be considered, as described in reference to block 216. Initially, the computer system can iteratively adjust the initial locations for the initial batches. Subsequently, the computer system can iteratively adjust the locations for any new batches and/or initial batches that are modified/iteratively adjusted. When iteratively adjusting the locations for a batch, the computer system can seek to minimize total time to build the batch and/or build consecutive batches. To iteratively adjust locations in the batch, the computer system can swap and/or move one or more location assignments for the batch (refer to FIG. 4). The computer system can then determine whether the move is feasible (refer to FIG. 7), and if it is feasible, the computer system can score the adjusted locations. The computer system can determine whether the score for the adjusted locations is an improvement over the score for the initial locations and/or other locations that were previously updated/adjusted for the batch. The computer system can continue to iteratively adjust the assigned locations as described here to determine which alternative locations can be optimal, preferred, or otherwise an improvement over other assigned locations for the batch. The optimal, preferred, or improved locations can have a lowest estimated completion time for the gantry layer picking system to build all the pallets in the batch.

The computer system can also iteratively adjust the batches to test alternative batch adjustments based at least in part on the task schedules and the locations (block 224). To iteratively adjust the batches, the computer system can evaluate batch moves by considering the operating time of the gantry head as well, the setup time, and tasks in the task schedule for the batch. Initially, the computer system can iteratively adjust the initial batches. Subsequently, the computer system can iteratively adjust any new batches that are determined and/or initial batches that are modified/iteratively adjusted. When iteratively adjusting the batches, the computer system can seek to group together as many pallets as possible that can be fulfilled using the same source pallets. To iteratively adjust a batch, the computer system can swap, move, or otherwise insert one or more pallets in the batch (refer to FIG. 3). The computer system can also modify ordering of a series of batches, such as batches 1, 2, and 3 described above, so as to reduce an amount of moves needed to go in and out of the pick area to complete a batch as well as other batches in a series of batches. The computer system can then determine whether the adjustment is feasible (refer to FIG. 7), and if it is feasible, the computer system can score the adjusted batch. The computer system can determine whether the score for the adjusted batch is an improvement over the score for the initial batch and/or other batches that were previously updated/adjusted. The computer system can continue to iteratively adjust the batches as described here to determine which alternative batch can be optimal, preferred, or otherwise an improvement over other batches. The optimal, preferred, or improved batch can have a minimum amount of moves needed to go in and out of the pick area to complete the batch and/or subsequent batches.

The computer system can then determine whether a sufficiently good solution, such as a heuristic solution, can be identified/found in block 226. The computer system can identify a sufficiently good solution as one whose batch, location, and/or schedule scores are improvements over other batch, location, and/or schedule scores. The sufficiently good solution can be referred to as a heuristic solution. The sufficiently good solution may be a best, preferred, or otherwise optimal solution.

If the computer system does not identify a sufficiently good solution, the computer system can return to block 220 and iteratively adjust the schedules, locations, and/or batches in blocks 220-224 until a sufficiently good solution can be identified. If a sufficiently good solution is identified in block 226, the computer system can select the sufficiently good solution for the layer pick planning request (block 228). Therefore, the computer system may select, as the heuristic solution, a solution that includes a schedule, locations, and batches having improved respective scores over scores for other (such as the initial) schedule, locations, and/or batches that are determined using the disclosed techniques. In other words, the selected solution may include batches that require a minimum number of moves in and out of the pick area, assigned locations that require a least amount of time to complete a batch and/or subsequent batches, and a schedule that requires a least amount of distance traveled by the gantry layer picking system to complete a batch.

The computer system can also generate output based on the selected solution for the layer pick planning request (block 230). Refer to FIGS. 1B-C for additional discussion about the output. As an example, the computer system can generate a response to the layer pick planning request in block 232. The response can include an indication that a sufficiently good solution (e.g., the heuristic solution) has been identified and selected for the layer pick planning request. The response can also include information about the selected sufficiently good solution.

The computer system can also generate task queues for the gantry layer picking system described herein (block 234). The tasks queues can include control instructions for moving components of the gantry layer picking system in the pick area to fulfill the layer pick planning request. Similarly, as described herein, the computer system can generate instructions that, when executed (by the computer system 150 and/or a controller of the gantry layer picking system), cause the gantry head of the gantry layer picking system to perform tasks in the schedule for the selected sufficiently good solution. Moreover, the computer system can generate a carrier queue in block 236. The carrier queue can indicate which source pallets to send at which times to particular gantry layer picking systems in pick areas. The computer system can generate one or more other types of output in block 234. The output generated by the computer system can be transmitted to other computing systems, such as the WMS 154. The output from the process 200 can then be used by the other computing systems to perform or otherwise determine one or more other operations in the storage facility.

FIG. 3 is a flowchart of a process 300 for determining heuristic batches as part of planning layer picking activities. The process 300 can be performed as part of block 224 in the process 200 of FIGS. 2A-B, in which the computer system iteratively adjusts the batches to test alternative batch adjustments. The process 300 can be performed by the computer system 150. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3, the computer system can identify initial batches and corresponding batch scores in block 302. In some implementations, the computer system can also identify any adjusted batches or new batches as well as their corresponding batch scores. It can be noted that any batches that are determined by the computer system can be stored in a data store (e.g., the data store 156) and can be retrieved by the computer system in block 302.

In block 304, the computer system can identify a set of possible batch moves. The computer system can determine, for example, one or more other orders of batches. As described in the process 200, an initial batch order can be 1, 2, 3. In block 304, the computer system can identify a possible batch order of 1, 3, and 2. The computer system can also determine one or more other possible batch moves. The computer system can also determine, for example, one or more moves of pallets between batches. For example, batches 1 and 3 can include destination pallets that require layers of items from a same source pallet. The computer system can move a destination pallet from batch 1 to batch 3 so that the destination pallets requiring items from the same source pallet can be grouped in the same batch.

The computer system can then move a pallet in the initial batches based on one of the possible batch moves (block 306). In the above example, the computer system can move a destination pallet from batch 1 to batch 3. In block 306, the computer system can also move batches in an order of batches. For example, the computer system can swap the order of batches 2 and 3 in the above example so that a new order of batches is 1, 3, and then 2. One or more other moves can be made in block 306 based on the set of possible batch moves.

The computer system can determine updated batch scores based on the move in block 308. The computer system can determine the updated batch scores based on the techniques described in the process 200 of FIGS. 2A-B. In some implementations, the computer system can first determine whether the move is feasible, as described in FIG. 7. If the move is feasible, the computer system can determine an updated batch score for the move. If the move is not feasible, then the computer system can proceed to block 314, discussed below.

In block 310, the computer system can determine whether the updated batch scores are an improvement over the batch scores for the initial batches. For example, the computer system can compare an updated batch score to a last (e.g., prior) batch score. If the updated batch score is lower than the last batch score, then the computer system can determine that the updated score is an improvement over the last score. In some implementations, the computer system can also compare the updated batch score to more than one batch score that was previously determined.

If the updated batch scores are not improvements over the initial batch scores, the computer system can discard the move in block 322. In other words, the updated batch score can be higher than last batch scores, such as initial batch scores, which means that the updated batch requires more moves to be made in and out of the pick area than prior determined batches. The updated batch may therefore not be efficient and thus not an improvement over prior determined batches. As a result, the updated batch can be discarded or otherwise not considered as a heuristic batch. The computer system can then proceed to block 314, discussed below.

If, on the other hand, the updated batch scores are improvements over the initial batch scores, then the computer system can proceed to block 312, in which the computer system can store the move as a candidate move for heuristic batches. The move can be stored in a data store, such as the data store 156. After all, the move can result in updated batches that require fewer moves than other batches that have been determined by the computer system. Heuristic batches can include optimal batches to complete the layer picking request.

Next, in block 314, the computer system can determine whether there are more possible batch moves that can be made. If there are more batch moves that can be made, then the computer system can return to block 306 and repeat blocks 306-312 until no additional batch moves are possible. If, on the other hand, there are no more possible batch moves in block 314, the computer system can proceed to block 316.

In block 316, the computer system can retrieve the stored candidate moves for the heuristic batches. The computer system can retrieve the candidate moves from the data store. The computer system can then identify at least one move that satisfies heuristic batch criteria in block 318. In some implementations, a move can satisfy the heuristic batch criteria if the move has a batch score that is less than a threshold score. The move can also satisfy the criteria if the move has a batch score that is less than other moves that have been determined or initial batches (e.g., a lowest batch score). As another example, in situations where more than one move has a same lowest batch score, the computer system can randomly select one of the moves having the same lowest batch score. One or more other criteria can also be used to determine which one or more batch moves can be implemented as part of a heuristic solution to complete the layer picking request. Finally, in block 320, the computer system can return the identified at least one move for generation of the heuristic batches. Therefore, the move can be used to determine optimal or preferred batches for completing the layer picking request.

The process 300 can be repeated for each batch that has been determined, such as initial batches. The process 300 can also be performed and repeated for each layer picking request that is received by the computer system from the WMS. Moreover, the process 300 can be performed each time that a task schedule and/or locations for a batch are iteratively adjusted, as described further below. The process 300 can be iteratively performed until a heuristic solution is determined for a particular batch and/or a particular layer picking request.

FIG. 4 is a flowchart of a process 400 for determining heuristic locations for pallets in a pick area as part of planning layer picking activities. The process 400 can be performed as part of block 222 in the process 200 of FIGS. 2A-B, in which the computer system iteratively adjusts the locations to test alternative location adjustments. The process 400 can be performed by the computer system 150. The process 400 can also be performed by one or more other computing systems, devices, computers, networks, cloud-based systems, and/or cloud-based services. For illustrative purposes, the process 400 is described from the perspective of a computer system.

Referring to the process 400, the computer system can identify locations for pallets in a batch and their corresponding location scores in block 402. The locations can be previously determined in the process 200, as described in FIGS. 2A-B. The batch can be an initial batch from an initial feasible solution (e.g., refer to FIGS. 2A-B). The batch can also be a moved batch or a heuristic batch, as described in FIG. 3.

In block 404, the computer system can identify a set of possible location moves. The computer system can determine and simulate, for example, one or more other location assignments for source pallets and/or destination pallets in the batch. Once the computer system identifies possible location moves, the computer system can move a pallet in the batch based on one of the possible moves (block 406). For example, a move can include assigning a source pallet to a location closest to a location of another source pallet, where the another source pallet can be picked immediately after the moved source pallet. As another example, a move can include assigning a source pallet to a location closest to a location of a destination pallet, where the destination pallet may require multiple layers of items from that source pallet. As part of moving the pallet based on one of the possible moves, the computer system can estimate a total amount of time needed for the gantry layer picking system to move between the assigned locations to complete the batch.

The computer system can determine an updated location score based on the move in block 408. The updated location score can be a numeric value indicating the estimated total amount of time needed to complete the batch, as described above. In some implementations, as described in reference to FIG. 3, the computer system may first determine whether the location move is feasible before determining the updated location score. Therefore, the computer system may only determine the updated location score if the move is feasible. If the move is not feasible, then the computer system can discard the move in block 422 and proceed to block 414.

The computer system can determine whether the updated location score is an improvement over the location score for the batch (block 410). As described above, the updated location score can be an improvement over the location score, or multiple prior location scores for the batch, if the updated location score is less than the other location score(s). A smaller location score can indicate less total time needed to complete the batch, which means higher efficiency and maximizing throughput. As described in reference to the process 200 in FIGS. 2A-B, the smaller location score can also indicate less total time needed to complete multiple subsequent batches. After all, a location score of a batch can include location scores for batches before and/or after the batch. Thus, the location score for the batch can provide a more holistic metric indicating efficiency of the gantry layer picking system in completing multiple batches and maximizing throughput.

If the updated location score is not an improvement, meaning the updated location score is greater than the other location score(s), then the computer system can discard the move in block 422. After all, the move may not result in lowering a total amount of time needed by the gantry layer picking system to complete the batch. The computer system can then proceed to block 414, described further below.

If the updated location score is an improvement, meaning the updated location score is less than the other location score(s), then the computer system can store the move as a candidate move for heuristic pallet locations in block 412. After all, the move may result in lowering a total amount of time needed to complete the batch, which is an indicator of improved efficiency and throughput by the gantry layer picking system. The move can be stored in a data store, such as the data store 156.

Next, in block 414, the computer system can determine whether there are more possible location moves that can be determined. If more moves are possible, the computer system can return to block 406 and repeat blocks 406-412 until there are no more possible location moves to make. If no more moves are possible in block 414, the computer system can retrieve the stored candidate moves for the heuristic pallet locations in block 416.

The computer system can then identify at least one move that satisfies heuristic pallet locations criteria in block 418. For example, the computer system can select a move having a lowest updated location score amongst the moves. The lowest updated location score can indicate that the move results in a least amount of time needed by the gantry layer picking system to complete the batch. In some implementations, the moves having updated location scores within a threshold range or less than a threshold value can be selected in block 418. Those moves can be identified as, in the aggregate, resulting in a least amount of time for batch completion. One or more other criteria can be used to identify the move(s) that maximizes efficiency and improves throughput in the picking process.

Finally, the computer system can return the identified at least one move for generation of the heuristic pallet locations (block 420). The at least one move can be returned as a heuristic move for the heuristic solution described herein. Thus, the at least one move can be used to efficiently complete the layer picking request.

The process 400 can be repeated for each batch that has been determined, such as initial batches. The process 400 can also be performed and repeated for each layer picking request that is received by the computer system from the WMS. Moreover, the process 400 can be performed each time that a task schedule for a batch is iteratively adjusted, as described further below. The process 400 can be iteratively performed until a heuristic solution is determined for a particular batch and/or a particular layer picking request.

Figure 5A:
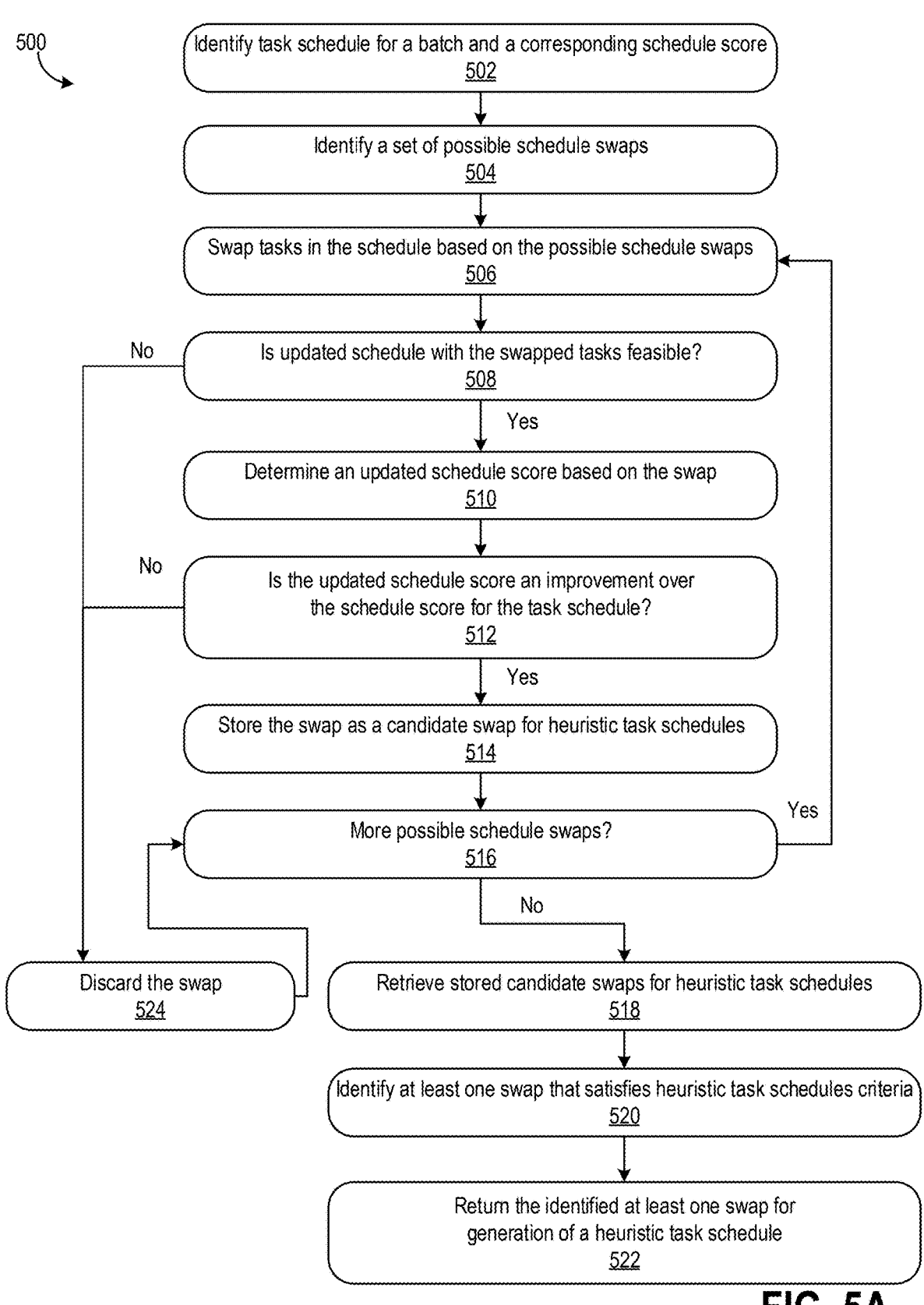
FIG. 5A is a flowchart of a process for determining heuristic task schedule swaps as part of planning layer picking activities.

FIG. 5A is a flowchart of a process 500 for determining heuristic task schedule swaps as part of planning layer picking activities. The process 500 can be performed to iterate through changes to a task schedule. For example, the process 500 can begin with a current task schedule, such as an initial task schedule and a computer system can flip or swap sequences of tasks in the schedule then check whether those flips or swaps are feasible. The flips or swaps can be evaluated by determining their corresponding schedule scores and whether those schedule scores are better than the schedule score for the current task schedule. Flips or swaps that have improved schedule scores can be saved and selected when determining a heuristic schedule for completing the corresponding layer pick planning request.

The process 500 can be performed as part of block 220 in the process 200 of FIGS. 2A-B, in which the computer system iteratively adjusts the task schedule(s) to test alternative schedule adjustments. The process 500 can be performed by the computer system 150. The process 500 can also be performed by one or more other computing systems, devices, computers, networks, cloud-based systems, and/or cloud-based services. For illustrative purposes, the process 500 is described from the perspective of a computer system.

Referring to the process 500 in FIG. 5A, the computer system can identify a task schedule for a batch and a corresponding schedule score in block 502. The batch can be an initial batch from an initial feasible solution (e.g., refer to FIGS. 2A-B). The batch can also be a moved batch or a heuristic batch, as described in FIG. 3.

In block 504, the computer system can identify a set of possible schedule swaps. The computer system can simulate, for example, swapping or flipping the order of one or more tasks in the task schedule. The computer system can then swap tasks in the schedule based on the possible schedule swaps in block 506. For example, a swap can include flipping a first task with a fifth task so that the first task is performed fifth and the fifth task is performed first. As part of swapping one or more tasks in the schedule for the batch, the computer system can estimate a total distance traveled by the gantry layer picking system to complete the tasks in the updated order.

Next, in block 508, the computer system can determine whether the updated schedule with the swapped tasks is feasible. Refer to FIG. 7 for additional discussion about the feasibility assessment.

If the updated schedule is not feasible, the computer system can discard the swap in block 524 then proceed to block 516, discussed further below. If the updated schedule is feasible, the computer system can determine an updated schedule score based on the swap in block 510. The updated schedule score can be a numeric indication of the total distance traveled by the gantry layer picking system to complete the tasks in the updated schedule. The computer system can determine whether the updated schedule score is an improvement over the schedule score for the task schedule (block 512). The updated schedule score can be an improvement over the schedule score for the task schedule, such as the initial score or prior adjusted task schedules, if the updated schedule score is less than the schedule score. A smaller schedule score can indicate less total distance to be traveled by the gantry layer picking system than a higher schedule score.

Accordingly, if the updated schedule score is not an improvement over the schedule score, then the computer system can discard the swap in block 524. After all, the updated schedule may require the gantry layer picking system to travel a greater distance than the initial task schedule or other prior adjusted task schedules. The computer system can then proceed to block 516, described further below.

If the updated schedule score is an improvement, then the computer system can store the swap as a candidate swap for heuristic task schedules in block 514. After all, the updated schedule may require the gantry layer picking system to travel a smaller distance than the initial task schedule or other prior adjusted task schedules, thereby indicating that the updated schedule is more efficient and maximizes throughput in the picking process. The swap can be stored in a data store, such as the data store 156.

Next, in block 516, the computer system can determine whether there are more possible task swaps that can be determined, made, and/or simulated. If more swaps are possible, the computer system can return to block 506 and repeat blocks 506-514 until there are no more possible task swaps. If no more swaps are possible in block 516, the computer system can retrieve the stored candidate swaps for the heuristic task schedules in block 518.

The computer system can then identify at least one swap that satisfies heuristic task schedules criteria in block 520. As described above in reference to the processes 300 and 400 in FIGS. 3 and 4, respectively, the at least one swap can be identified if it's corresponding schedule score is less than any other candidate swap's schedule score. In some implementations, the computer system can identify more than one swap as satisfying the criteria if the more than one swap have corresponding schedule scores that are within a threshold range and/or less than a threshold value. One or more other criteria can be used to identify the at least one swap in block 516.

Finally, the computer system can return the identified at least one swap for generation of the heuristic task schedule (block 522). In other words, the at least one swap can be used to determine the heuristic task schedule for the heuristic solution of the layer picking request. The at least one swap can be used for the heuristic solution of the batch since the at least one swap can result in reducing a total distance traveled by the gantry layer picking system when completing the batch.

As described above, the process 500 can be repeated for each batch that has been determined, such as initial batches. The process 500 can also be performed and repeated for each layer picking request that is received by the computer system from the WMS. Moreover, the process 500 can be iteratively performed until a heuristic solution is determined for a particular batch and/or a particular layer picking request.

Figure 5B:
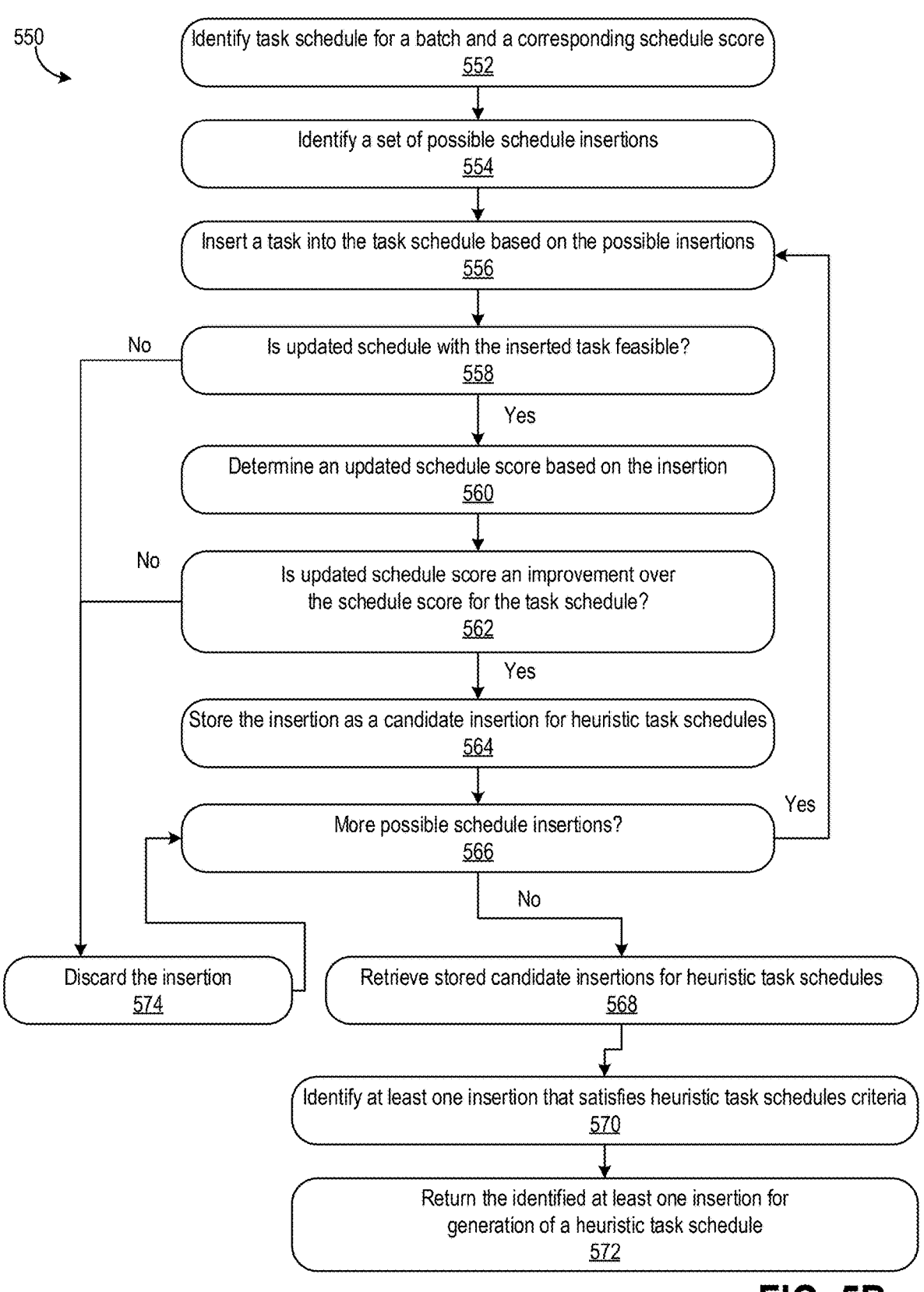
FIG. 5B is a flowchart of a process for determining heuristic task schedule insertions as part of planning layer picking activities.

FIG. 5B is a flowchart of a process 550 for determining heuristic task schedule insertions as part of planning layer picking activities. In the process 550, tasks that are initially slotted to start at one time can be moved to start at another time. Such insertions can be assessed for feasibility and to determine whether the insertions are improvements over prior schedule scores, as described above. The process 550 can be performed as part of block 220 in the process 200 of FIGS. 2A-B, in which the computer system iteratively adjusts the task schedule(s) to test alternative schedule adjustments. The process 550 can be performed by the computer system 150. The process 550 can also be performed by one or more other computing systems, devices, computers, networks, cloud-based systems, and/or cloud-based services. For illustrative purposes, the process 550 is described from the perspective of a computer system.

Referring to the process 550 in FIG. 5B, the computer system can identify a task schedule for a batch and a corresponding schedule score in block 552. Refer to the block 502 in the process 500 of FIG. 5A for additional discussion.

In block 554, the computer system can identify a set of possible schedule insertions. Similar to the set of possible schedule swaps in block 504 of the process 500, the computer system can determine where throughout the task schedule one or more tasks can be inserted (e.g., moved).

The computer system can then insert a task into the task schedule based on the possible schedule insertions in block 556. The computer system moves the task from a position that the task was previously in the schedule to another, different position in the schedule. As part of inserting the task into the task schedule, the computer system can also estimate a total distance traveled by the gantry layer picking system to complete the tasks in the order they appear in the task schedule.

Next, in block 558, the computer system can determine whether the updated schedule with the inserted tasks is feasible. Refer to FIG. 7 for additional discussion about the feasibility assessment. If the updated schedule is not feasible, the computer system can discard the insertion in block 574 then proceed to block 566 discussed further below. If the updated schedule is feasible, the computer system can determine an updated schedule score based on the insertion in block 560. As described above, the updated schedule score can be a numeric value indicating the estimated total distance traveled by the gantry layer picking system to complete the tasks according to the updated schedule.

The computer system can determine whether the updated schedule score is an improvement over the schedule score for the task schedule (block 562). An updated schedule score that is less than (e.g., smaller than) the schedule score for the task schedule, such as an initial task schedule or other prior adjusted schedules, can be an improvement. After all, the smaller updated schedule score can indicate less total distance traveled by the gantry layer picking system. Less total distance traveled by the gantry layer picking system is indicative of improved efficiency and maximizing throughput in the picking process.

If the updated schedule score is not an improvement, then the computer system can discard the insertion in block 574. After all, the insertion can cause the gantry layer picking system to travel more distance than if the insertion was not made. The computer system can then proceed to block 566, described further below.

If the updated schedule score is an improvement, then the computer system can store the insertion as a candidate insertion for heuristic task schedules in block 564. After all, the insertion can cause the gantry layer picking system to travel less distance than with the initial task schedule and/or other prior adjusted task schedules.

Next, in block 566, the computer system can determine whether there are more possible task insertions that can be determined, made, and/or simulated. If more insertions are possible, the computer system can return to block 556 and repeat blocks 556-564 until there are no more possible task insertions. If no more insertions are possible in block 566, the computer system can retrieve the stored candidate insertions for the heuristic task schedules in block 568.

The computer system can identify at least one insertion that satisfies heuristic task schedules criteria in block 570. As described above, the computer system can identify an insertion having a lowest updated schedule score amongst the candidate insertions that are stored. The computer system can also identify one or more insertions amongst the candidate insertions having updated schedule scores within a threshold range and/or less than a threshold value. One or more other criteria can be used to identify the at least one insertion that can be used to determine a heuristic task schedule.

Finally, the computer system can return the identified at least one insertion for generation of the heuristic task schedule (block 572). As described herein, the at least one insertion can provide efficiency and maximize throughput for the picking process. Therefore, the at least one insertion can be identified for the heuristic task schedule in the heuristic solution for the layer picking request. The at least one insertion can also be used to iteratively adjust any one or more heuristic locations and/or heuristic batches that are determined in the processes 300 and 400.

Moreover, in some implementations, swaps and insertions may be performed to generate the heuristic solution. The computer system can first evaluate the swaps, weigh the swaps according to the corresponding schedule scores, and then determine whether to update the schedule based on the scheduling scores for the swaps. If the computer system determines that the schedule should be updated, the computer system can update the schedule to generate an updated schedule. Then, the computer system can evaluate insertions, weigh the insertions according to the corresponding schedule scores, and then determine whether to update the updated schedule with the insertions. Therefore, the computer system can perform favorable swaps to generate an updated schedule, when performing favorable insertions on the updated schedule. In some implementations, the computer system can determine that no swaps are favorable but may perform favorable insertions. As another example, the computer system can perform favorable swaps to generate the updated schedule, but may not perform insertions because the insertions may not be favorable for the updated schedule. As yet another example, the computer system can determine that neither swaps nor insertions are favorable to update the schedule.

As described above, the process 550 can be repeated for each batch that has been determined, such as initial batches. The process 550 can also be performed and repeated for each layer picking request that is received by the computer system from the WMS. Moreover, the process 550 can be iteratively performed until a heuristic solution is determined for a particular batch and/or a particular layer picking request.

FIGS. 6A-B are system diagrams of components that perform the techniques described herein. Referring to both FIGS. 6A-B, the computer system 150, WMS 154, and data store 156 communicate with each other via network(s) 152 described herein. The computer system 150 can include processor(s) 600, layer pick planning subsystem 602, and a communication interface 604. The processor(s) 600 can execute instructions to perform the operations described throughout this disclosure. The communication interface 604 can provide for communication between components of the computer system 150 and the WMS 154 and/or data store 156 via the network(s) 152.

As described herein, the computer system 150 can include various subsystems for performing different functions to optimize efficiency in a storage facility, such as a warehouse. As a non-limiting example, the computer system 150 can include a subsystem for processing and generating orders to create layer pick planning requests. Another subsystem can generate layer pick planning requests. Yet another subsystem can generate a preferred or best solution for organizing source and/or destination pallets in various locations throughout a warehouse, such as in storage areas. As another example, a subsystem can generate a preferred layout for various areas throughout the warehouse, including storage or supply areas, pick areas, manual assembly areas, and outbound areas. One or more other subsystems are possible. Moreover, one or more subsystems can be part of separate or different computer systems that are in communication with the computer system 150, the WMS 154, and/or the data store 156 via the network(s) 152.

Here, the layer pick planning subsystem 602 is displayed as being part of the computer system 150. The subsystem 602 can be configured to perform the operations described herein, such as determining an initial feasible solution for a layer pick planning request, scoring each determined batch, location, and task schedule, iteratively adjusting the determined batches, locations, and task schedules, and determining a heuristic (e.g., preferred, optimal, best) solution for the layer pick planning request. The heuristic solution for the layer pick planning request can then be transmitted to the WMS 154 or another subsystem of the computer system 150 for additional processing and operations. For example, the WMS 154 or another subsystem 602 can transmit instructions to a gantry layer picking system that causes the gantry layer picking system to perform operations of the heuristic solution. As another example, and as described throughout this disclosure, the subsystem 602 (or the computer system 150, more generally) can also generate and transmit the instructions to the gantry layer picking system to perform the operations of the heuristic solution.

The layer pick planning subsystem 602 can include an initial feasible solution determiner 606, a batch determiner 608, a location determiner 610, a schedule determiner 612, a heuristic solution engine 614, a solution selection engine 616, and an output generator 618.

The initial feasible solution determiner 606 can be configured to determine an initial feasible solution for a layer pick planning request that is received from the WMS 154. As described in the process 200 in FIGS. 2A-B, the determiner 606 can identify initial batches, locations, and schedules as part of determining the initial feasible solution. The determiner 606 can also determine scores for each of the initial batches, locations, and schedules. The initial feasible solution can be stored as data 636A-N. The stored data 636A-N can include, but is not limited to, corresponding layer pick request data 620A-N, the initial feasible solution for the layer pick planning request, initial batch data (e.g., grouping of pallets in batches and/or order of batches), initial location data (e.g., location assignments for pallets in each batch), initial schedule data (e.g., order of tasks to be performed for each batch), batch score(s), location score(s), and schedule score(s). One or more other information can also be stored in the data 636A-N.

The batch determiner 608 can be configured to determine initial batches for layer pick planning requests and/or iterative adjustments of initial batches or prior determined/adjusted batches. The batch determiner 608 can also determine corresponding batch scores for the determined batches. Moreover, the batch determiner 608 can perform a feasibility assessment as described in FIG. 7. Refer to the processes 200 and 300 in FIGS. 2A-B and 3 for additional discussion about batch determinations.

The location determiner 610 can be configured to determine initial location assignments for layer pick planning requests and/or iterative adjustments of initial locations or prior determined/adjusted locations. The location determiner 610 can also determine corresponding location scores for the determined locations. Moreover, the location determiner 610 can perform a feasibility assessment as described in FIG. 7. Refer to the processes 200 and 400 in FIGS. 2A-B and 4 for additional discussion about location determinations.

The schedule determiner 612 can be configured to determine initial task schedules for layer pick planning requests and/or iterative adjustments of task schedules or prior determined/adjusted task schedules. The schedule determiner 612 can also determine corresponding schedule scores for the determined task schedules. Moreover, the schedule determiner 612 can perform a feasibility assessment as described in FIG. 7. Refer to the processes 200, 500, and 550 in FIGS. 2A-B, 5A, and 5B for additional discussion about location determinations.

The heuristic solution engine 614 can receive the initial batches, initial locations, initial task schedules, iteratively adjusted batches, iteratively adjusted locations, and iteratively adjusted task schedules, and their corresponding scores, from the initial feasible solution determiner 606, the batch determiner 608, the location determiner 610, and/or the schedule determiner 612. The engine 614 can then determine whether iteratively adjusted batches, locations, and/or task schedules are improvements over other, prior batches, locations, and/or task schedules. Refer to the processes 200, 300, 400, 500, and 550 in FIGS. 2A-B, 3, 4, 5A, and 5B for additional discussion about identifying improvements. The heuristic solution engine 614 can then generate a heuristic solution for the layer pick planning request using the batches, locations, and task schedules that are identified as improvements. In some implementations, generation of the heuristic solution can be performed by the solution selection engine 616. Thus the heuristic solution engine 614 may instead determine whether any batches, locations, and/or schedules are improvements over prior batches, locations, and/or schedules. The engine 614 can then discard batches, locations, and/or schedules that are not improvements and store, in the data store 156, batches, locations, and/or schedules that are improvements as candidate batches, locations, and/or schedules for the heuristic solution.

The solution selection engine 616 can be configured to determine which candidate batches, locations, and/or schedules satisfy criteria to be selected for the heuristic solution. The solution selection engine 616 can, for example, identify candidate batch, location, and/or schedule that has a lowest corresponding score or otherwise has a corresponding score that is within a threshold amount or less than a threshold value. The identified batch, location, and/or schedule can then be selected and added to the heuristic solution for the layer pick planning request. Whenever one or more schedules, locations, and/or tasks are iteratively adjusted by one or more components of the computer system 150, the solution selection engine 616 can regenerate or otherwise modify the heuristic solution to include candidate batches, locations, and schedules that satisfy criteria to be selected for the heuristic solution. The engine 616 can also store the heuristic solution, such as in output 638A-N.

The output generator 618 can receive the heuristic solution from the solution selection engine 616 and use it to generate output for the layer pick planning request. The output, as described throughout this disclosure, can include an indication of batches, locations, and task schedules that have been identified as part of the heuristic solution for the layer pick planning request. The output can also include instructions that, when executed by components of the gantry layer picking system, cause the gantry layer picking system to perform operations to complete the layer pick planning request (according to the heuristic solution).

Output generated by the generator 618 can be stored as output 638A-N. The output 638A-N can include corresponding layer pick request data 620A-N, the heuristic solution for the layer pick planning request, heuristic batch data (e.g., groups of pallets in batches, batch order, heuristic batch scores), heuristic location data (e.g., location assignments for pallets in each batch, heuristic location scores), heuristic schedule data (e.g., order of tasks in a schedule, heuristic schedule scores), heuristic batch score, heuristic location score, heuristic schedule score, task queue, and/or carrier queue. Moreover, the output 638A-N can include, for each gantry layer picking system, a set of tasks to execute, with each task having data that may include gantry layer picking system ID, gantry head ID, task code, corresponding request code, task execution order, source pallet data, destination pallet data, task type, number of layers, exception execution order, and expected start and end times. For each source pallet that has to be transported to the pick area, the output 638A-N can include a pallet ID, item code, customer code, number of cases on the pallet, number of layers reserved for layer picking, number of layers to remove foil, best-before data, destination gantry layer picking system ID, destination pallet stand location number, expected release time, expected time needed, and/or expected usable time.

Components of the layer pick planning subsystem 602 can receive, or retrieve, a variety of data to perform the techniques described herein. For example, the components of the subsystem 602 can receive layer pick request data 620A-N from the data store 156 and/or the WMS 154 to then determine an initial feasible solution for the layer pick request. The data 620A-N can be used to build pallets both for outbound (e.g., destination pallets to customers) and for replenishment of flow racks or other locations in the storage facility.

The components of the subsystem 602 may receive a set of layer pick requests and their corresponding data 620A-N to be added at an end of a current planning process. The data 620A-N can include a request code, status code, and set of orders 622A-N to be processed. Each order 622A-N can include data such as a request code, facility code, order number, rush order flag (e.g., Y/N, yes/no, etc.), and a set of destination pallets to build. For each destination pallet to build, the order data 622A-N can further include pallet numbers (e.g., identifiers such as IDs, SKUs, barcodes, etc.), a number of layers to pick, layer height, layer weight, temperature zone for the pallet, and/or a build order. In some implementations, for each destination pallet, the order data 622A-N can also include an owner code (e.g., customer code or ID), truck or other vehicle arrival for outbound shipment, and/or item codes (e.g., IDs).

Additionally, the components of the subsystem 602 can receive from the WMS 154 or retrieve from the data store 156 gantry task data 624A-N, which can also be used to determine the initial feasible solution. The gantry task data 624A-N can include a gantry ID (e.g., such as a gantry pick area ID, a gantry head ID, etc.), task code(s) to be performed by the gantry layer picking system, task execution order(s), source pallet(s) ID(s), source pallet(s) location ID(s), destination pallet(s) ID(s), destination pallet(s) location ID(s), task type(s) that can be performed, number of layers to build, and/or expected start/end times of tasks by the corresponding gantry layer picking system. The task types can include but are not limited to gantry layer pick move, empty pallet move, administrative tasks such as swapping and/or assigning tasks, and/or transferring vehicle tasks out of the pick area. In some implementations, the gantry task data 624A-N can also include corresponding request codes for tasks to be performed by the gantry layer picking system and/or exception execution orders.

Moreover, the components of the subsystem 602 can receive from the WMS 154 or retrieve from the data store source pallet data 626A-N to be used to determine the initial feasible solution for the layer pick planning request. The source pallet data 626A-N can include but is not limited to pallet ID, item code(s), owner code(s), total number of cases on a pallet, number of layers reserved for layer picking, destination gantry ID, destination pallet location ID in the pick area, expected release time, and/or expected time needed (e.g., when a first pick may happen for the layer pick planning request). In some implementations, the source pallet data 626A-N can also include a best-before date (e.g., if the items on the pallet are food items such as perishables like meat and vegetables in a cold storage facility). The source pallet data 626A-N may also include data such as a number of layers to remove foil or other wrapping around such layers. Moreover, the source pallet data 626A-N can include expected time of usability, which can indicate when a destination location pallet stand (e.g., an assigned location in the pick area) may be free.

The components of the subsystem 602 may also receive or retrieve supporting data about items and/or inventory positions to perform the techniques described herein. This supporting data may be standardized across different WMSs. From inventory position supporting data, the components of the subsystem 602 can select sets of needed source pallets to satisfy the layer pick planning requests that are received from the WMS 154. For example, the components of the subsystem 602 can retrieve item master information at least for a set of items needed for the destination pallets to build in the layer pick planning requests. The item master information can include, but is not limited to, item codes, number of cases per layer (e.g., ti of a full pallet), number of layers on a pallet (e.g., hi of a full pallet), layer height, layer weight, and/or temperature zone. The components of the subsystem 602 can also retrieve the source pallet data 626A-N as described above.

The components of the subsystem 602 may also receive or retrieve gantry configuration data 628A-N to perform one or more of the techniques described herein. For example, the data 628A-N can be used to determine and/or estimate total times for the gantry layer picking system to complete tasks in a schedule or schedules for the layer pick planning request. The data 628A-N can therefore be used to simulate the initial feasible solution and adjustments to batches, locations, and/or schedules for the layer pick planning request. Moreover, the data 628A-N can be used to determine batch, location, and schedule scores.

The gantry configuration data 628A-N can include gantry pallet data 630A-N, gantry head data 632A-N, and/or transfer vehicle data 634A-N. The gantry pallet data 630A-N can include gantry ID, position ID and/or type, transfer vehicle ID, X-coordinate, and Y-coordinate. The gantry head data 632A-N can include X/Y direction maximum speed, X/Y direction acceleration, Z direction maximum speed, Z direction acceleration, Z direction deceleration, inflation time, and deflation time. The transfer vehicle data 634A-N can include maximum speed, acceleration, deceleration, pickup time, and drop off time.

In implementations in which a carrier location update and/or a planning update is received by the computer system 150, components of the computer system 150 may require additional data to update a location within a heuristic solution or perform another adjustment to a solution for a layer pick planning request. With a carrier location update, the components of the computer system 150 may receive a pick area ID, pallet IDs, and/or current locations of pallets (e.g., outside the pick area, within the pick area) to determine one or more adjustments to the solution for the layer pick planning request. With a planning update, the components of the computer system 150 may receive data such as a set of tasks from the current solution that are involved (e.g., need to be removed, re-planned, and/or a corresponding pallet location that has been updated). For each task in the set of tasks, the data can include a task ID, request code, pick area ID, gantry head ID, and/or expected time available. The components of the computer system 150 may also receive a set of layer pick planning requests that may be added to a list of operations to be performed by the components. For each request in the set of layer pick planning requests, the received data can include a request code, facility code, order number, rush order flag, and data about a set of pallets to build for an order in the request. Supporting data, as described above, can also be received and used to select new pallets from inventory, for example if a source pallet is not available to be delivered to the pick area and/or if a rush order has been added to the layer pick planning requests.

One or more other data can be used to perform the techniques described herein. FIG. 7 is a flowchart of a process 700 for determining feasibility of a task schedule as part of planning layer picking activities. Although the process 700 is described in reference to task schedule feasibility, the process 700 can also be used to determine feasibility of batch adjustments as well as location adjustments. For example, the computer system described herein can determine that location adjustments are feasible based on a determination that a source pallet or destination pallet is not assigned, for a same period of time, a same location in the pick area as another source pallet or destination pallet. As another example, the computer system can determine that batch adjustments are feasible based on a determination that (i) the batch adjustments increase a build order by a threshold amount, (ii) the batch adjustments do not violate at least one transform, and (iii) the batch adjustments do not violate reverse picks.

Moreover, the process 700 can be performed as part of blocks 220, 222, and/or 224 in the process 200 of FIGS. 2A-B, in which the computer system can iteratively adjust the batches, locations, and schedules to test alterative batches, locations, and schedule adjustments for the layer pick planning request. Likewise, the process 700 can be performed during the processes 300, 400, 500, and/or 550, before batch, location, and/or schedule scores are determined.

The initial feasible solution described in the process 200 can be constructed to be feasible. Testing alternative locations for a batch (e.g., refer to the process 400 in FIG. 4) can sometimes cause scheduling adjustments that may not be feasible. As an illustrative example, insertion moves can be restricted to empty pallet locations or locations where a transformation of source pallet to destination pallet can occur. As a result, such location swaps can be considered feasible. However, transforming a source pallet into a destination pallet requires inserting the source pallet and the order pallet at the same location. This transformation can occur when no other order task corresponding to the destination pallet is executed yet and an order task(s) activating this transformation require(s) an exact amount of layers of the item that are present on the source pallet right before executing the order task(s). When multiple order tasks activate this transformation, these order tasks have to be executed right after each other. Hence, when this transformation is included in the solution, such as a heuristic solution, additional feasibility conditions arise when testing alternative schedules. In that case, a scheduling move can be feasible if it does not change supplied layers of the transformed source pallet just before the order task(s) activating the transformation and if it leaves the destination pallet unused just before the order task(s) activate the transformation.

Moreover, in testing alternative batches, batch moves can be feasible when a number of pallets needed to execute the order tasks of an operating cycle does not exceed a maximum number of pallets that fit in the pick area. Hence, creating a not yet existing operating cycle in a batching insertion adjustment by inserting an order task into this new operating cycle can be considered feasible. An operating cycle can be removed as well, if all order tasks of that operating cycle are inserted into other operating cycles. In case transformations of source pallets to destination pallets are included, similar or same additional conditions as in testing alternative schedules may arise.

The process 700 can be performed by the computer system 150. The process 700 can also be performed by one or more other computing systems, devices, computers, networks, cloud-based systems, and/or cloud-based services. For illustrative purposes, the process 700 is described from the perspective of a computer system.

Referring to the process 700, the computer system can retrieve a task schedule for a batch in block 702. The batch can be an initial batch, an updated or new batch, and/or a heuristic batch as described throughout this disclosure. The task schedule can be retrieved from a data store.

In block 704, the computer system can identify a set of operations for the task schedule. For example, the computer system can identify all tasks to be performed (or otherwise assigned) in the schedule.

The computer system can then determine whether all of the operations in the set are accounted for in block 706. In other words, the computer system can determine whether all operations (e.g., tasks) have been assigned positions in the schedule to ensure that all operations are performed and not left out from a schedule. If operations are left out, then one or more destination pallets may not be fully or properly built, resulting in incomplete batches, and inefficiencies in the picking process.

If all of the operations are accounted for, the computer system can identify the task schedule as feasible in block 708. Therefore, the computer system can determine that the task schedule is, at a minimum, good enough to complete the batch because all operations that need to be performed are slotted in positions in the schedule. The computer system can then continue with processes described above, such as with blocks 308 in the process 300 of FIG. 3, 408 in the process 400 of FIG. 4, 510 in the process 500 of FIG. 5A, and 560 in the process 550 of FIG. 5B.

If all of the operations are not accounted for in block 706, the computer system can proceed to block 710, in which the computer system can determine one or more new task schedules for the unaccounted operations. Sometimes, the task schedule may include some of the operations but not all. For example, the task schedule may not include operations when not all depleted pallets that are not reused are cleaned up in the batch. Thus, additional tasks to clean up depleted source pallets and/or depleted pallet stacks (e.g., pallets containing empty pallets that are used as starting pallets for destination pallets) may be added later to the task schedule. These tasks may not be part of the task schedule but can depend on which source pallets are chosen and in which order tasks are to be executed. Thus, these additional tasks can be added later into the task schedule, especially in instances where a depleted source pallet is determined as one not to be reused. As another example, some operations may not be included in the task schedule for reverse picking. With reverse picking, some tasks created in the task schedule may need to be replaced by other tasks that execute a reverse pick rather than a 'normal' pick. These tasks for reverse picking may depend on an order of tasks in the task schedule and thus can be added later to the task schedule in situations where reverse picking may be more efficient than normal picking tasks.

In order to complete the batch, the unaccounted operations should be slotted in one or more other task schedules. The decision of which unaccounted operations to put in the one or more other task schedules can be based on which schedule is missing those unaccounted operations. For example, the decision can depend on which task schedule involves a depleted source pallet and/or which task schedule initially involves normal picking and now should include reverse picking. A task schedule having the depleted source pallet can be updated to include the corresponding unaccounted operations while a task schedule that should include reverse picking should be updated to include the corresponding unaccounted operations.

Next, the computer system can determine whether the new task schedule(s) increase a build order by a threshold amount (block 712). If the new task schedule(s) does not increase the build order by the threshold amount, the computer system can identify the new task schedule(s) as infeasible in block 718. If the new task schedule(s) does increase the build order by the threshold amount, the computer system can proceed to block 714. The new task schedule(s) is feasible if it increases build orders of the same destination pallet by the threshold amount. In some implementations, the threshold amount can be 1. One or more other threshold amounts can also be used. In some implementations, the computer system can also identify the new task schedule(s) as feasible in block 718 if the new task schedule(s) results in building orders of the same destination pallet in a sequence (e.g., [0, 1, 1, 1, 2, 2, 3, 3] instead of [0, 1, 2, 3, 2, 1]).

In block 714, the computer system can determine whether the new task schedule(s) violates transforms. A transform is when a source pallet can be used as a starting pallet of a destination pallet. As described throughout this disclosure, a depleted source pallet can be transformed into the starting pallet of any destination pallet that may require a same pallet type as the depleted source pallet. A depleted source pallet can also be transformed into a starting pallet if the source pallet has x layers on it if the destination pallet requires the same pallet type and also needs (at least) x layers for the destination pallet's building order. If any of the transforms are violated, the computer system can identify the new task schedule(s) as infeasible in block 718. If any of the transforms are not violated, the computer system can proceed to block 716.

In block 716, the computer system can determine whether the new task schedule(s) violate reverse picks. A reverse pick is a process in which a few layers from the source pallet are first moved to another pallet such that a transform, as described above in block 714, can be performed. As an illustrative example, eight layers of an item may be needed for a destination pallet and a source pallet holds ten layers of the item. Instead of moving the eight layers from the source pallet to another pallet designated as the destination pallet, reverse picking can be performed in which two layers from the source pallet are moved to the another pallet. Then, the source pallet (holding the eight layers) can be transformed into the destination pallet and the another pallet (holding the two layers) can be transformed into a source pallet. If one or more of the reverse picks are violated, the computer system can identify the new task schedule(s) as infeasible (block 718). If the reverse picks are not violated, the computer system can identify the new task schedule(s) as feasible in block 720.

The computer system can then determine whether more task schedules are available for feasibility assessment in block 722. If there are more task schedules, the computer system can return to block 702 and repeat the process 700 for all remaining task schedules for the batch. If there are no more task schedules for the batch, the process 700 can stop. Stopping the process can include returning to one or more blocks in the processes described above, such as block 510 in the process 500 of FIG. 5A or block 560 in the process 550 of FIG. 5B.

Figure 8:
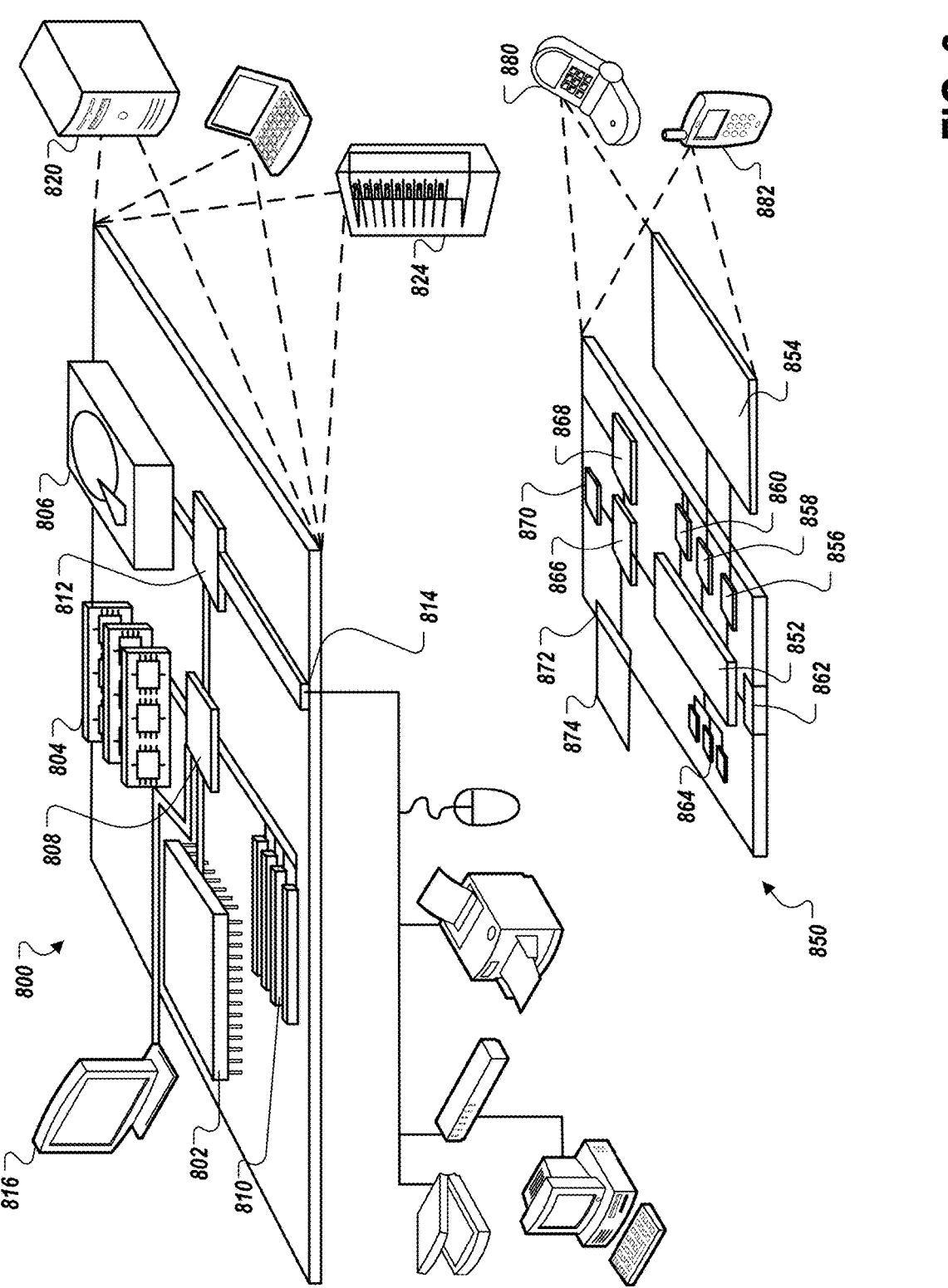
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multiprocessor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provided as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for determining and controlling automated layer pick operations, the system comprising:
an automated layer picking system in a pick area of a warehouse, the automated layer picking system comprising a picking tool that is configured to grasp and move one or more layers of cases from source pallets to destination pallets in the pick area; and
a computer system in communication with the automated layer picking system, the computer system being configured to:
receive, from a warehouse management system, a layer pick planning request for items that are stored in the warehouse;
retrieve, from a data store, information associated with the layer pick planning request, wherein the information includes layer pick request data and inventory position data;
determine, based on the retrieved information, an initial feasible solution for completing the layer pick planning request, wherein determining the initial feasible solution includes:
determining initial batches of pallets based on grouping destination pallets that require layers of items from source pallets,
determining, based on the initial batches of the pallets, corresponding batch scores, wherein the corresponding batch scores indicate a total amount of moves required by the automated layer picking system to move the source pallets into the pick area,
determining initial locations of the pallets in each of the initial batches in the pick area,
determining, based on the initial locations of the pallets, corresponding location scores, wherein the corresponding location scores indicate a total amount of time required by the automated layer picking system to execute at least one of the initial batches of pallets,
determining an initial schedule for each of the initial batches based on determining an order of tasks for the automated layer picking system to execute to complete the initial batch, and
determining, based on the initial schedule for each of the initial batches, a corresponding schedule score, wherein the corresponding schedule score indicates a total distance traveled by the automated layer picking system to execute the tasks in the initial schedule;
iteratively adjust the initial schedule for each batch to test alternative task schedules, by iteratively:
moving at least one task in the initial schedule from a first execution time to a second execution time to generate an updated schedule,
performing a simulation of completion of the updated schedule by the automated layer picking system to determine a total distance traveled by the automated layer picking system,
generating an updated schedule score based on the total distance traveled by the automated layer picking system according to the simulation,
determining whether the updated schedule score is an improvement over the schedule score of the initial schedule, and (i) in response to determining that the updated schedule score is an improvement over the schedule score of the initial schedule, identifying the updated schedule as a heuristic schedule and adjusting the initial schedule according to the heuristic schedule, or (ii) in response to determining that the updated schedule score is not an improvement over the schedule score of the initial schedule, discarding the updated schedule;
iteratively adjust the initial locations of the pallets for each batch to test alternative locations based at least in part on the heuristic schedule;
iteratively adjust the initial batches to test alternative batches based at least in part on the adjusted initial schedule and the adjusted initial locations;
identify a heuristic solution for the layer pick planning request based on the alternative task schedules, the alternative locations, and the alternative batches; and
return the heuristic solution for the layer pick planning request.

2. The system of claim 1, wherein the automated layer picking system is a gantry layer picking system and the picking tool is a gantry head.

3. The system of claim 1, wherein determining initial batches of pallets further comprises determining an order for which the automated layer picking system to execute the initial batches.

4. The system of claim 1, wherein determining initial locations of pallets comprises assigning one or more source pallets required for a first destination pallet proximate an assigned location of the first destination pallet and assigning one or more other source pallets required for a second destination pallet proximate an assigned location of the second destination pallet.

5. The system of claim 1, wherein the location scores indicate a total amount of time required by the automated layer picking system to execute a first batch and at least one subsequent batch.

6. The system of claim 1, wherein the location scores indicate a total amount of time required by the automated layer picking system to execute a first batch and at least one prior batch.

7. The system of claim 1, wherein the location scores indicate a total amount of time required by the automated layer picking system to execute a first batch, at least one prior batch, and at least one subsequent batch.

8. The system of claim 1, wherein the computer system is further configured to generate instructions that, when executed, cause the automated layer picking system to execute tasks in the heuristic solution to complete orders that comprise the layer pick planning request.

9. The system of claim 1, wherein the updated schedule score is an improvement over the schedule score of the initial schedule if the updated schedule score is less than the schedule score of the initial schedule.

10. The system of claim 1, wherein moving the at least one task comprises swapping the at least one task with another task in the initial schedule.

11. The system of claim 1, wherein moving the at least one task comprises inserting the at least one task into another execution timeslot in the initial schedule.

12. The system of claim 1, wherein the computer system is further configured to determine whether the updated schedule is feasible.

13. The system of claim 12, wherein determining whether the updated schedule is feasible comprises:

identifying a set of operations for the updated schedule;

determining whether the set of operations are accounted for in the updated schedule; and identifying the updated schedule as feasible based on a determination that the set of operations are accounted for.

14. The system of claim 13, wherein the computer system is further configured to:

determine a new task schedule for unaccounted operations based on a determination that the set of operations are not accounted for;

determine whether the new task schedule increases a build order by a threshold amount;

determine whether the new task schedule violates at least one transform based on a determination that the new task schedule increases the build order by the threshold amount;

determine whether the new task schedule violates reverse picks based on a determination that the new task schedule does not violate the at least one transform; and identify the new task schedule as feasible based on a determination that the new task schedule does not violate the reverse picks.

15. The system of claim 14, wherein the computer system is further configured to:

determine that the new task schedule is infeasible based on a determination that (i) the new task schedule does not increase the build order by the threshold amount, (ii) the new task schedule violates the at least one transform, and (iii) the new task schedule violates the reverse picks.

16. The system of claim 1, wherein the computer system is configured to iteratively adjust the initial locations of the pallets for each batch to test alternative locations based on:

assigning a source pallet in the batch to a location other than an assigned location of the source pallet in the initial locations to generate updated locations;

simulating movement by the automated layer picking system between the updated locations to determine a total time to complete the batch by the automated layer picking system;

generating updated location scores based on the total time to complete the batch, wherein the updated location scores are improvements over the location scores of the initial locations if the updated location scores are less than the location scores of the initial locations;

determining whether the updated location scores are improvements over the location scores of the initial locations;

identifying the updated locations as heuristic locations based on a determination that the updated location scores are improvements over the location scores of the initial locations; and discarding the updated locations based on a determination that the updated location scores are not improvements over the location scores of the initial locations.

17. The system of claim 16, wherein the computer system is further configured to determine that the updated locations are feasible based on a determination that the updated locations of the source pallet are different than assigned locations of other pallets in the batch such that no two pallets are assigned a same location in the updated locations.

18. The system of claim 1, wherein the computer system is configured to iteratively adjust the initial batches to test alternative batches based on:

changing an order in which the initial batches are to be completed by the automated layer picking system to generate updated batches;

simulating completion of the updated batches by the automated layer picking system to determine a total number of moves performed by the automated layer picking system to complete at least one of the updated batches;

generating updated batch scores based on the total number of moves, wherein the updated batch scores are improvements over the batch scores of the initial batches if the updated batch scores are less than the batch scores of the initial batches;

determining whether the updated batch scores are improvements over the batch scores of the initial batches;

identifying the updated batches as heuristic batches based on a determination that the updated batch scores are improvements over the batch scores of the initial batches; and discarding the updated batches based on a determination that updated batch scores are not improvements over the batch scores of the initial batches.

19. The system of claim 18, wherein the computer system is further configured to determine that the updated batches are feasible based on a determination that that (i) the updated batches increase a build order by a threshold amount, (ii) the updated batches do not violate at least one transform, and (iii) the updated batches do not violate reverse picks.

\* \* \* \* \*